United States Patent
Inoue et al.

(10) Patent No.: US 8,270,279 B2
(45) Date of Patent: Sep. 18, 2012

(54) OPTICAL INFORMATION RECORDING/REPRODUCING APPARATUS AND OBJECTIVE LENS FOR THE SAME

(75) Inventors: Satoshi Inoue, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 9 days.

(21) Appl. No.: 13/069,762

(22) Filed: Mar. 23, 2011

(65) Prior Publication Data
US 2011/0235496 A1    Sep. 29, 2011

(30) Foreign Application Priority Data
Mar. 24, 2010  (JP) ................. 2010-068688

(51) Int. Cl.
*G11B 7/00* (2006.01)
(52) U.S. Cl. .......... 369/112.03; 369/112.08; 369/112.23
(58) Field of Classification Search ............. 369/112.01, 369/112.03, 112.08, 112.07, 112.12, 44.37, 369/112.23, 112.13
See application file for complete search history.

(56) References Cited

U.S. PATENT DOCUMENTS

| | | | |
|---|---|---|---|
| 6,118,594 | A | 9/2000 | Maruyama |
| 2004/0160885 | A1 | 8/2004 | Kimura |
| 2004/0213131 | A1 | 10/2004 | Kimura et al. |

FOREIGN PATENT DOCUMENTS

| | | |
|---|---|---|
| JP | 2000-81566 | 3/2000 |
| JP | 2004-265573 | 9/2004 |
| JP | 2004-326862 | 11/2004 |

*Primary Examiner* — Nabil Hindi
(74) *Attorney, Agent, or Firm* — Greenblum & Bernstein P.L.C.

(57) ABSTRACT

An objective lens for an optical information recording/reproducing apparatus, at least one of optical surfaces of the objective lens comprising a diffraction surface having a diffraction structure defined by an optical path difference function, and wherein: the diffraction surface has a first region contributing to converging first and second light beams and having a diffraction structure configured such that diffraction orders at which the diffraction efficiencies are maximized for the first and second light beams are $1^{st}$ order; the diffraction surface has a second region located outside the first region, and the second region is configured to contribute to converging the first light beam and not to contribute to convergence of the second light beam; and the objective lens satisfies a condition:

$$35 < P2 \times f2 < 200 \qquad (1).$$

18 Claims, 26 Drawing Sheets

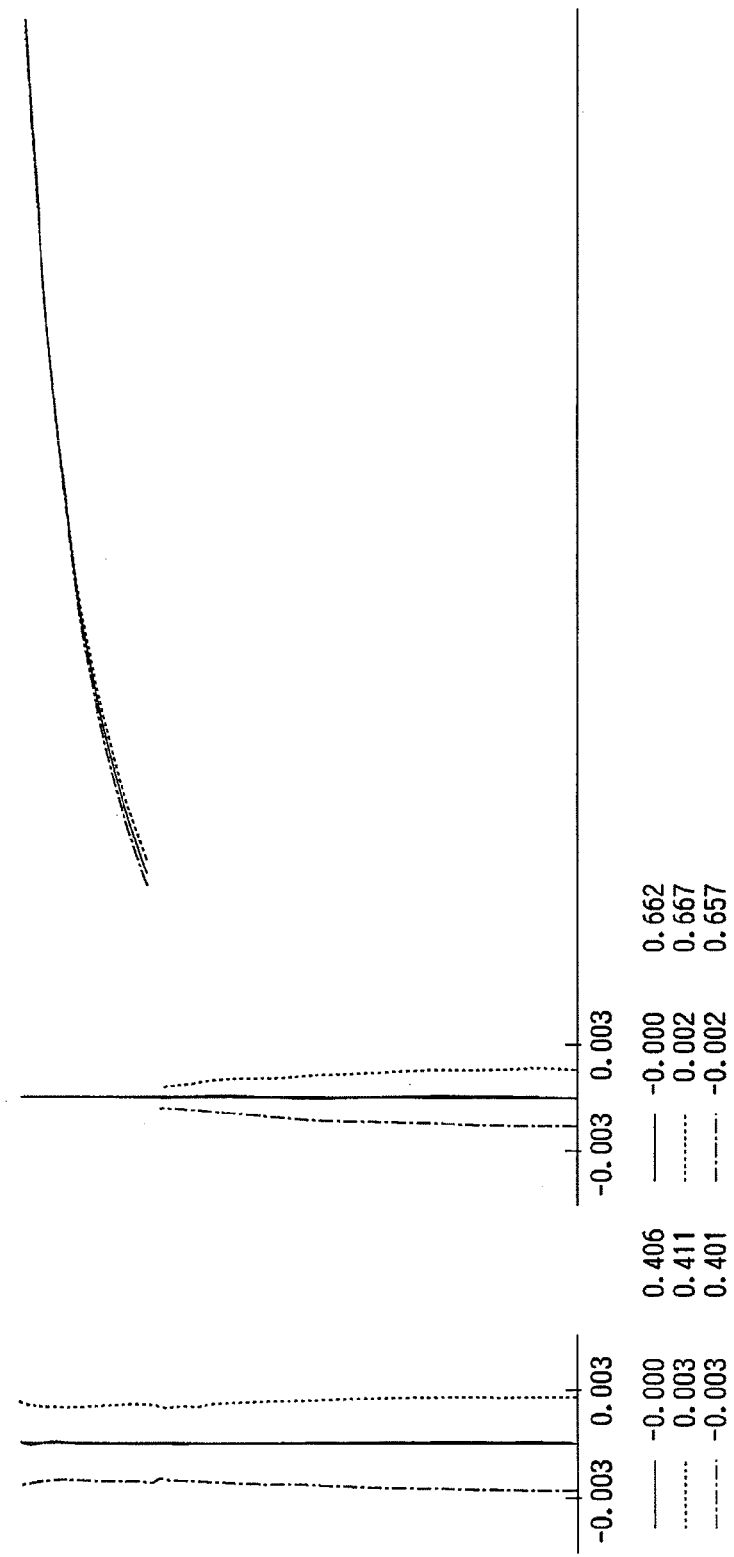

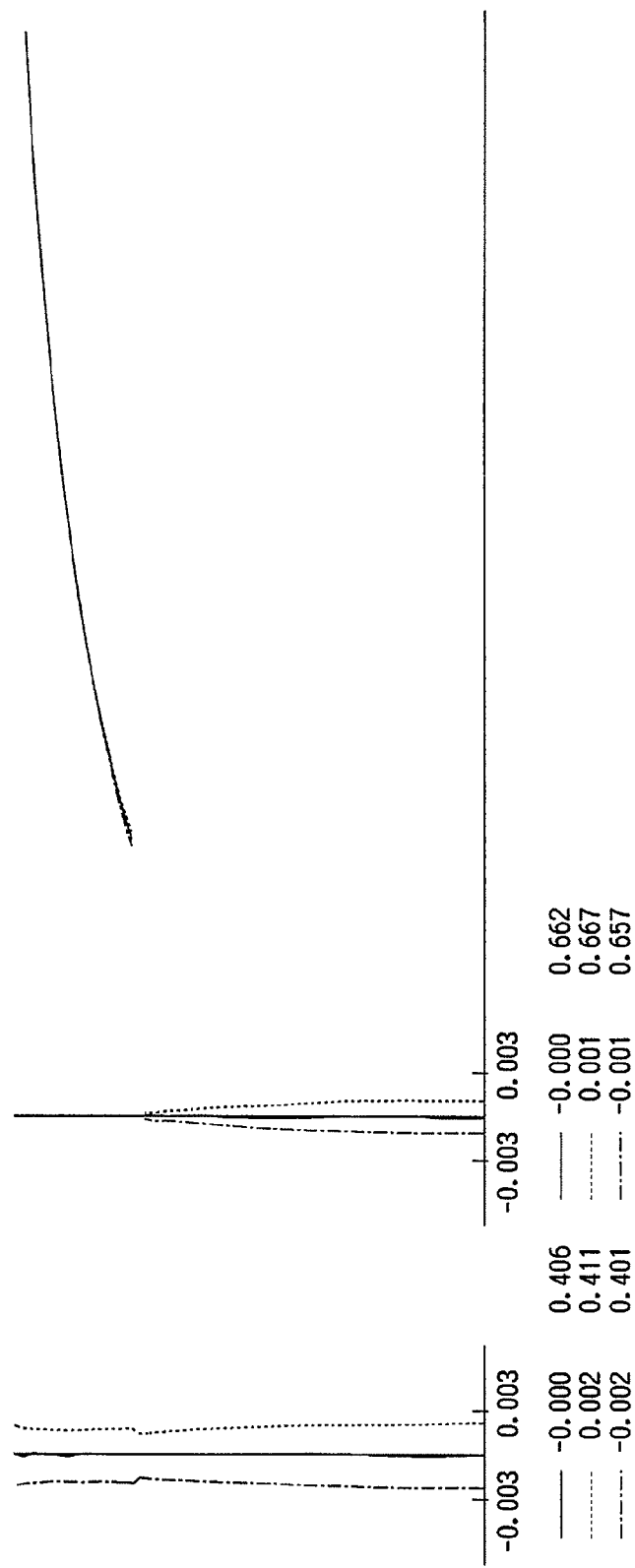

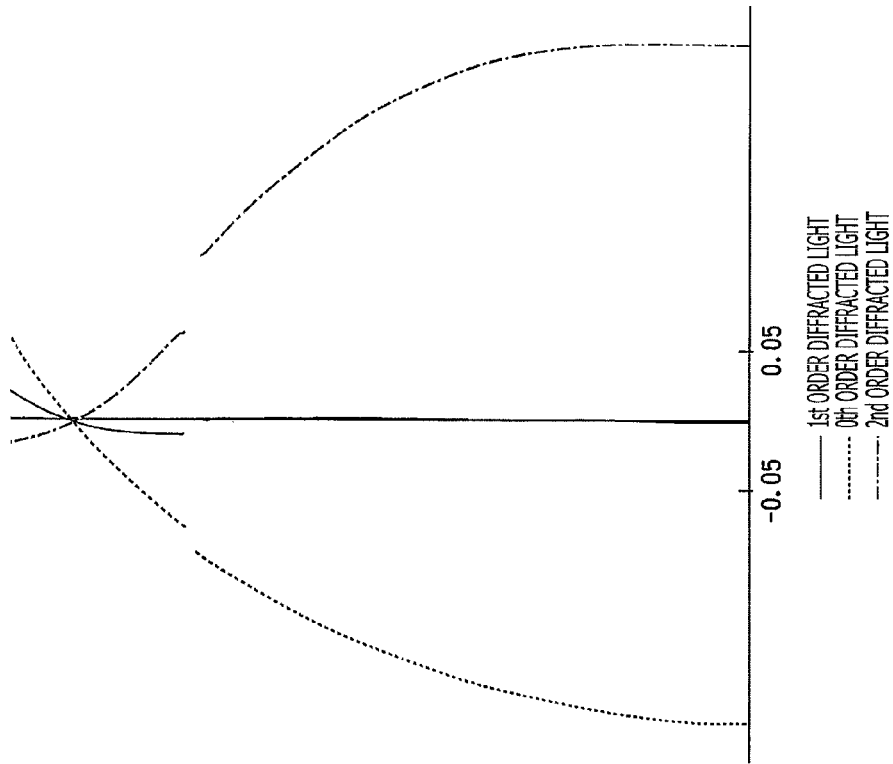
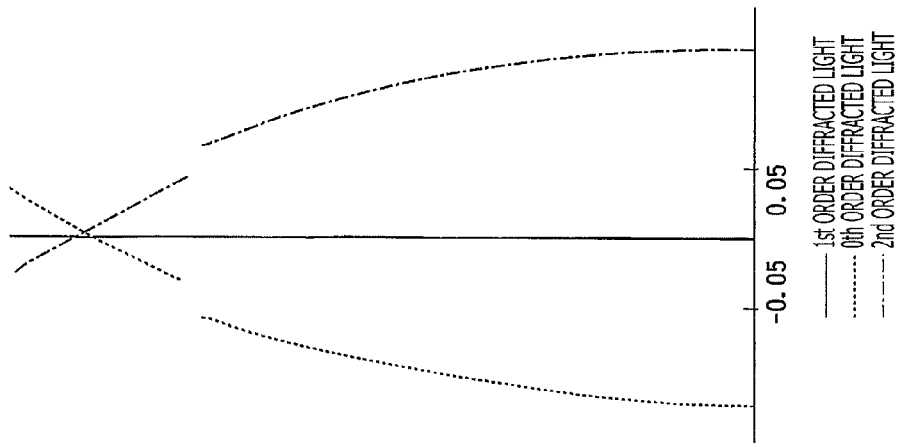
FIG. 10A
FIG. 10B

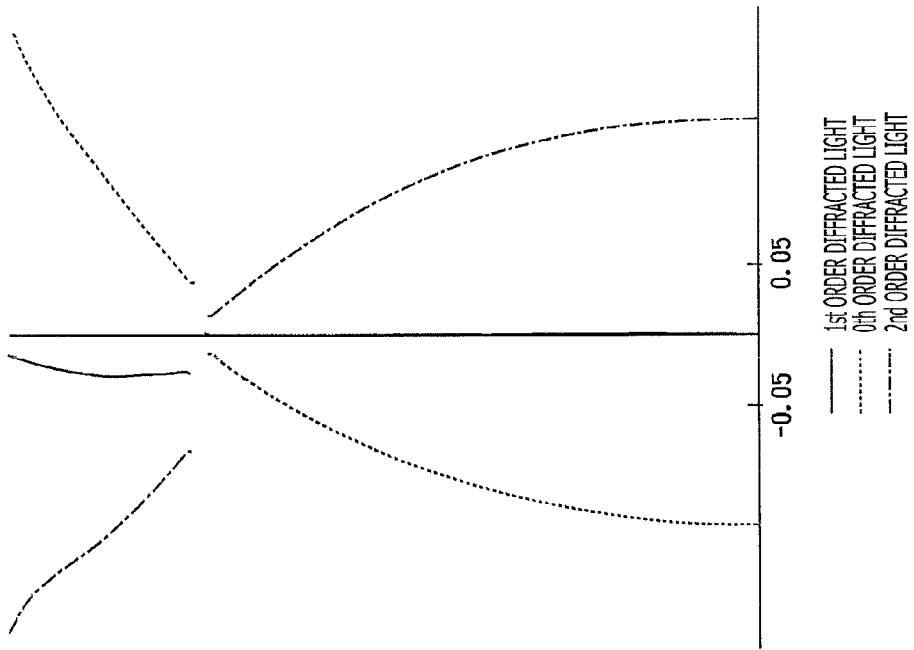
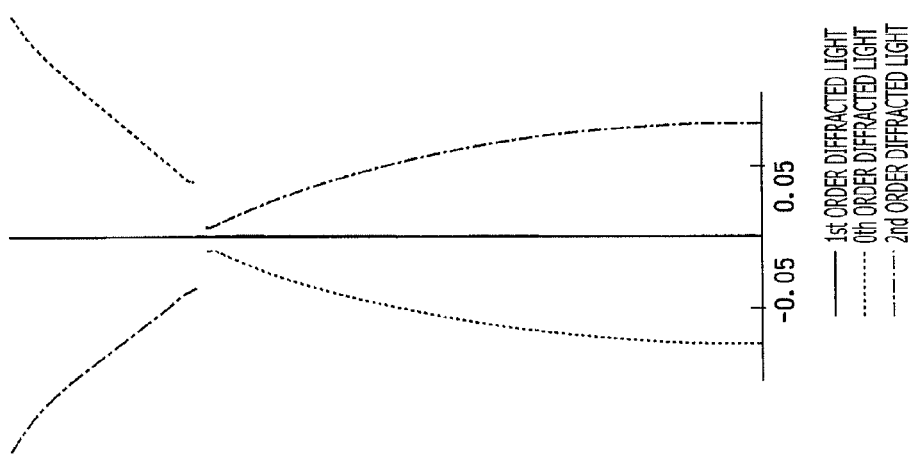

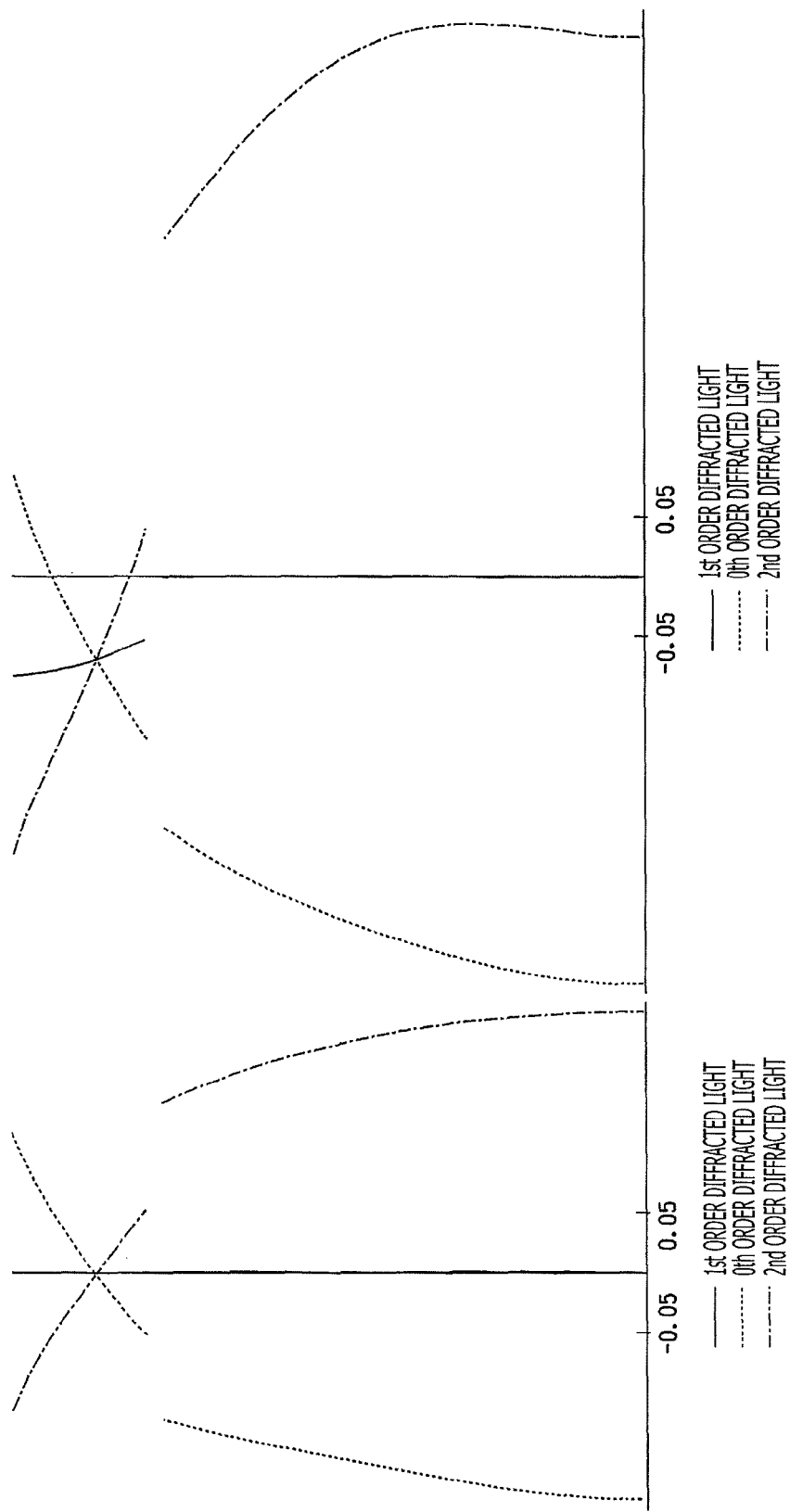

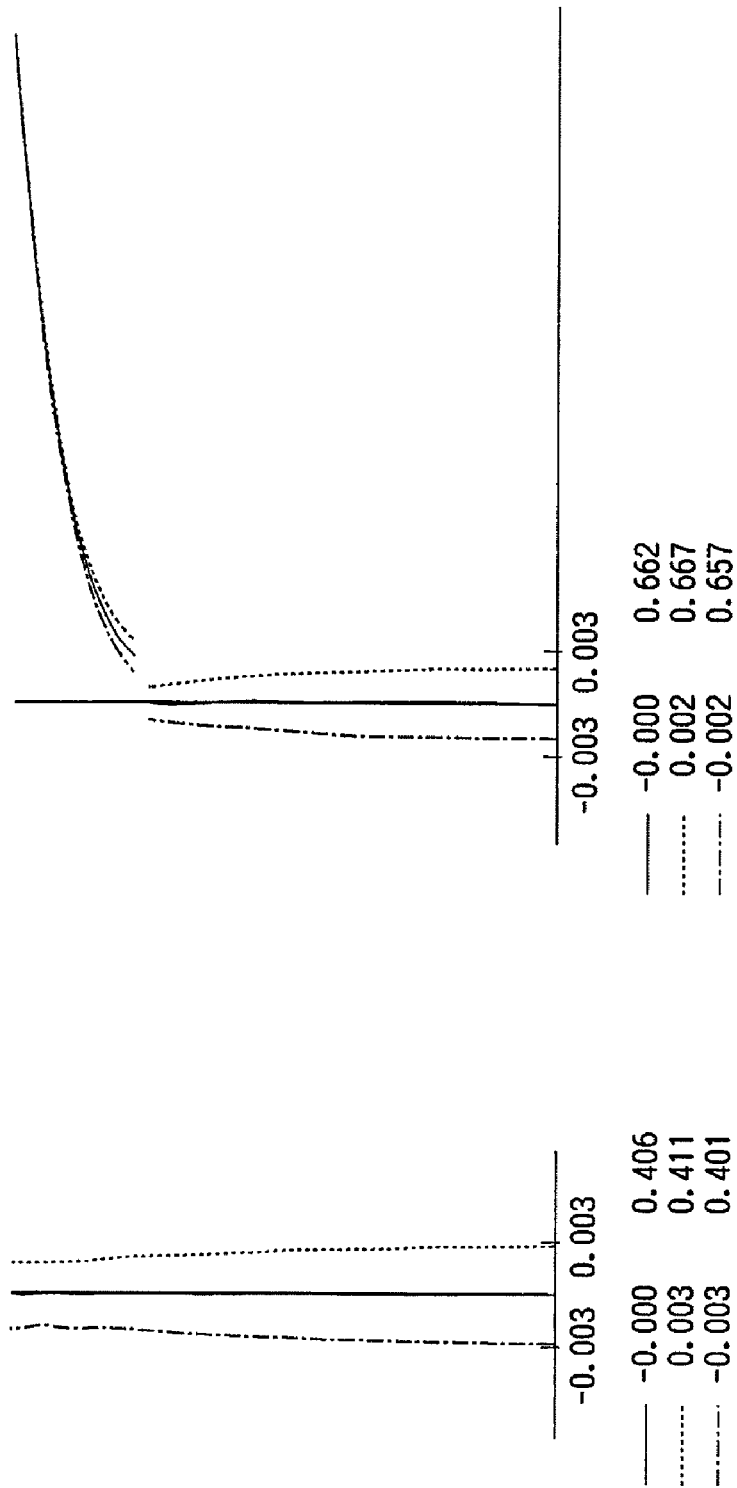

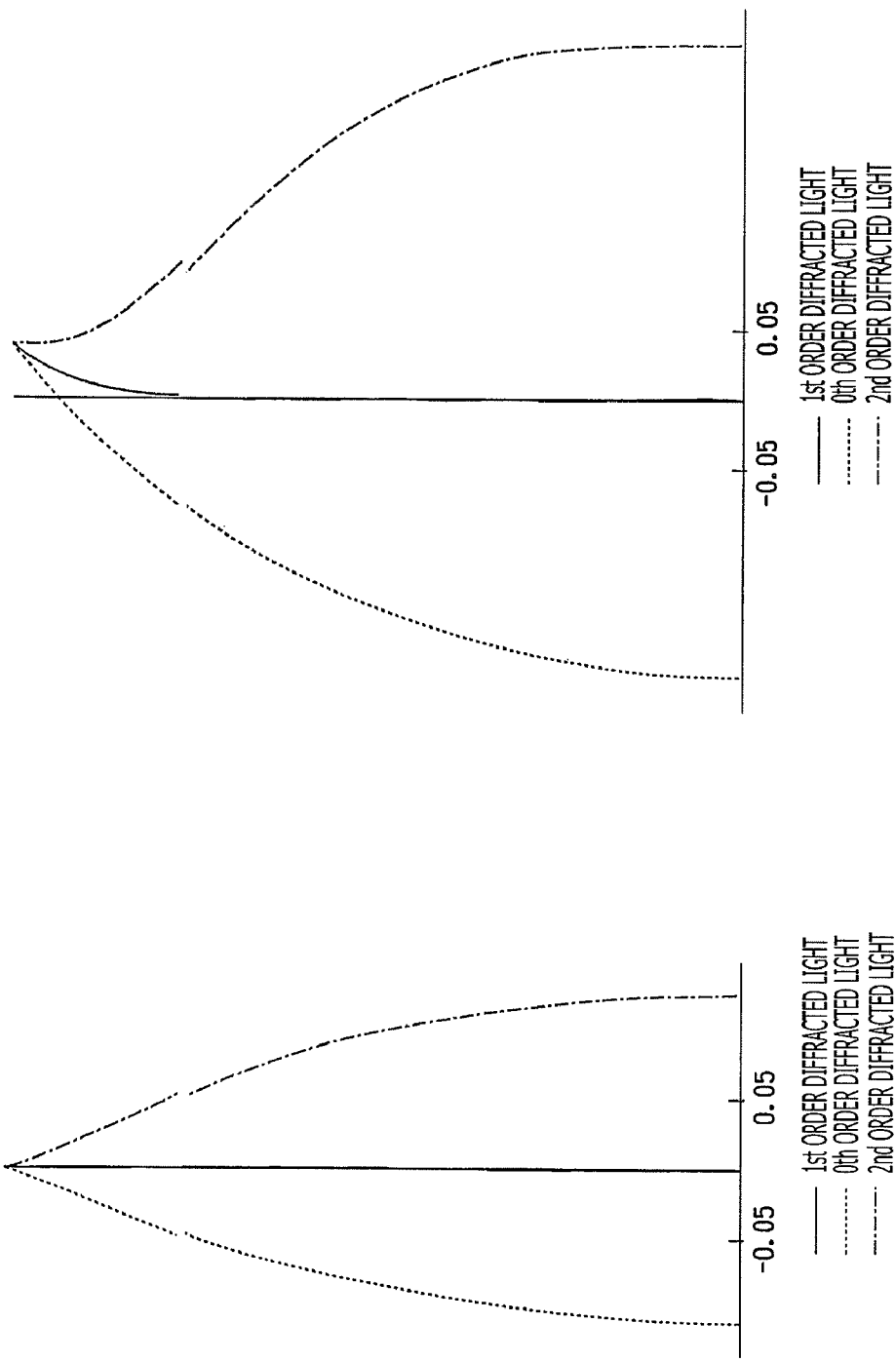

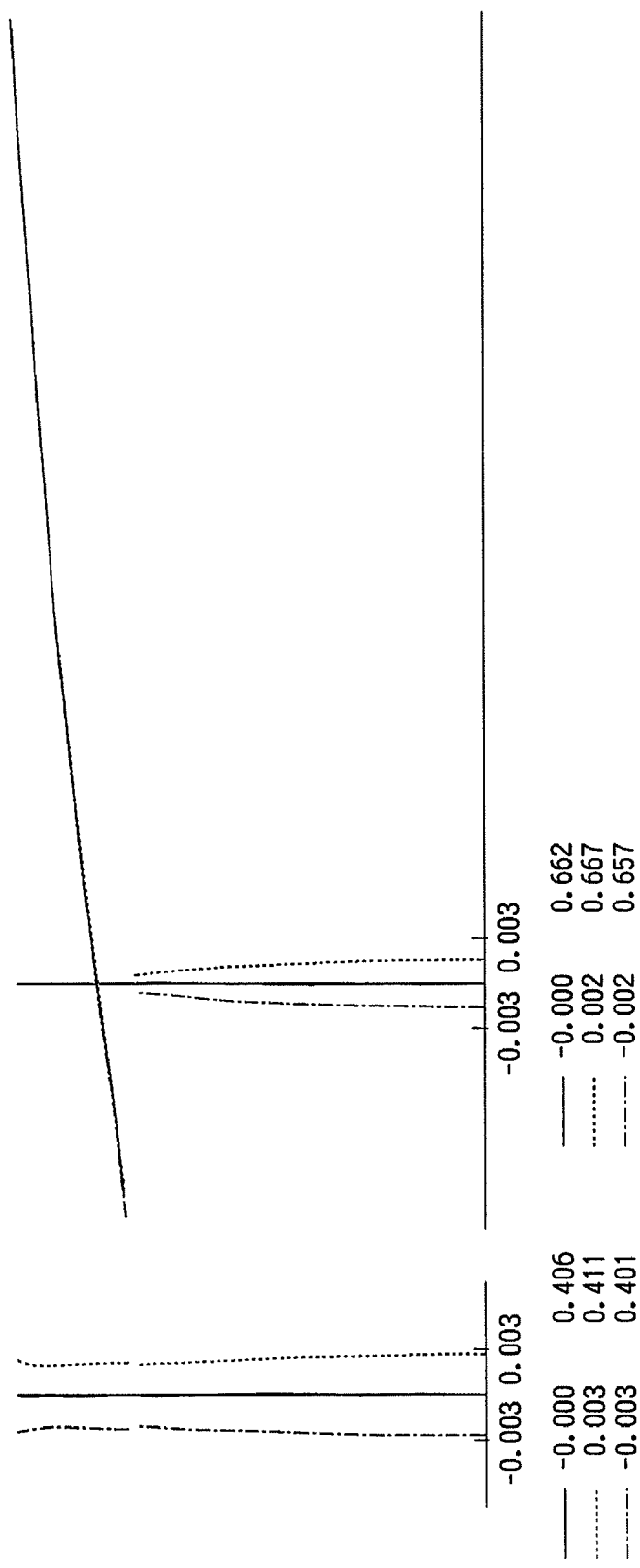

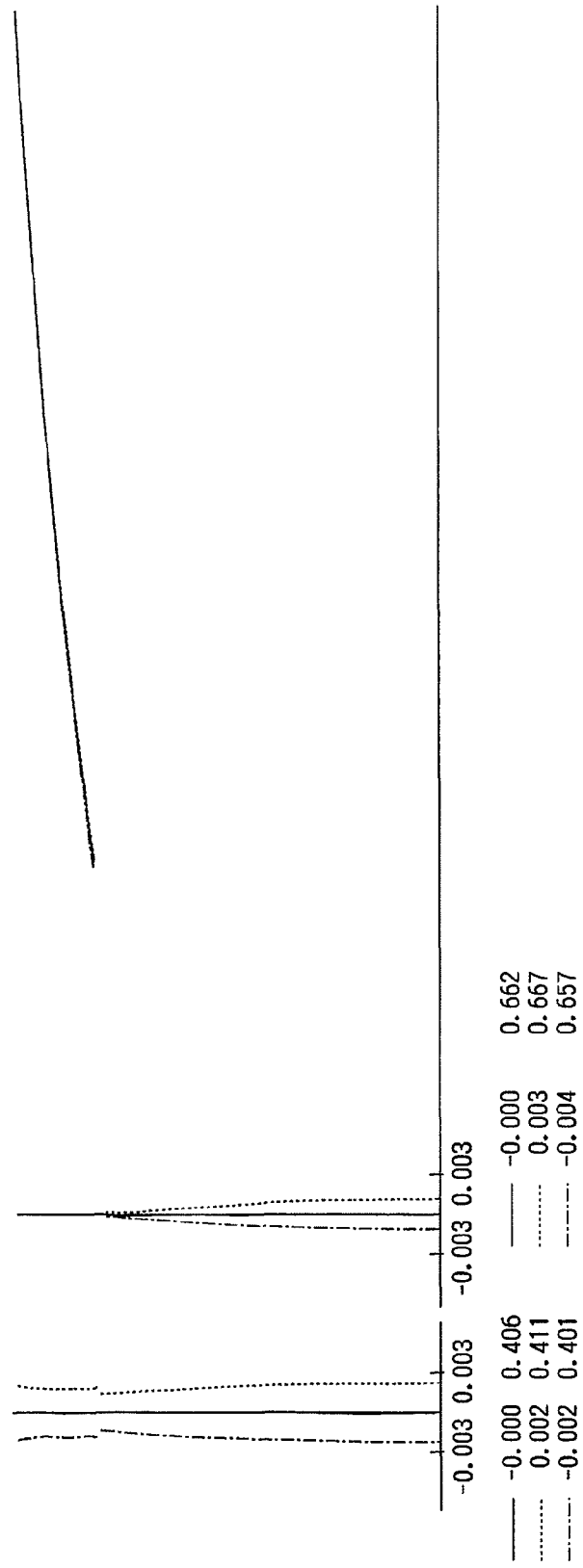

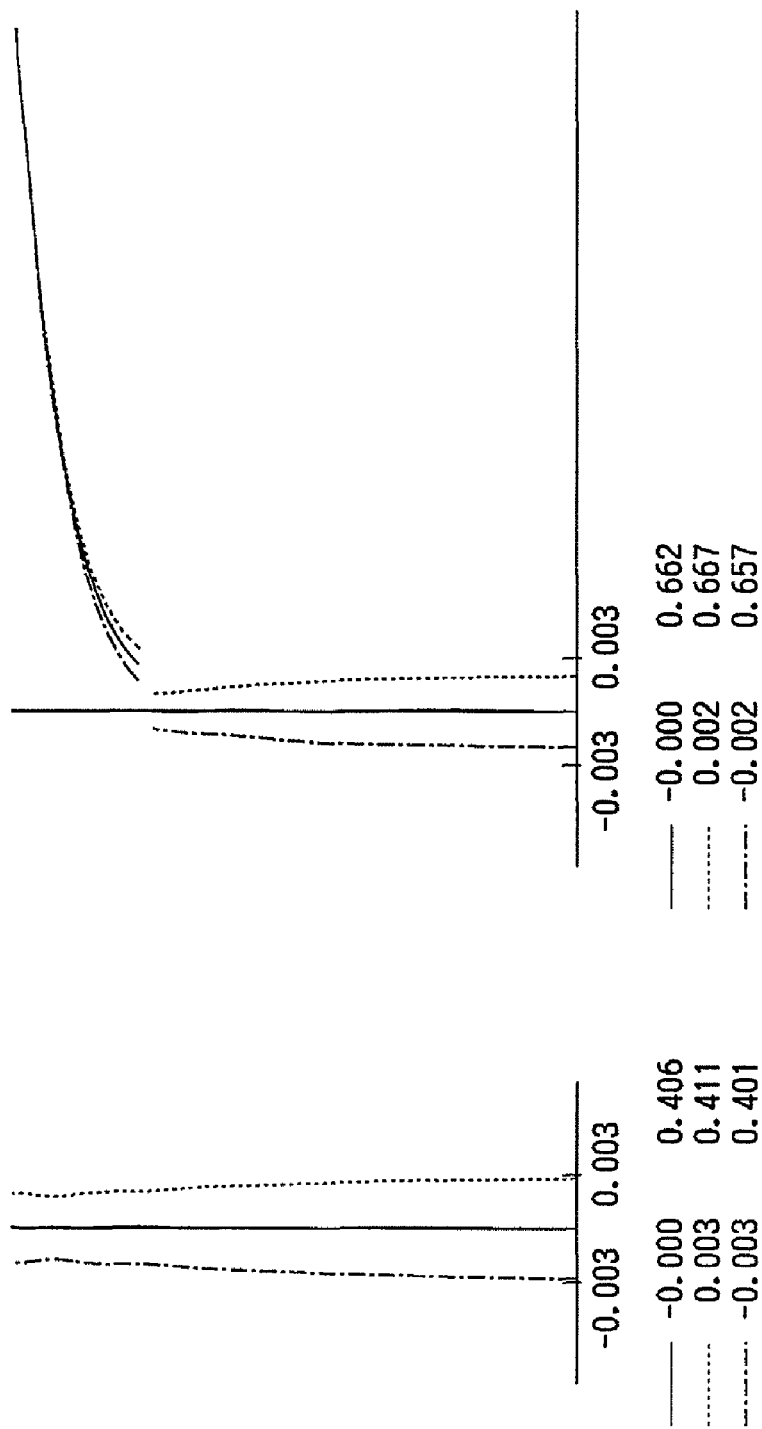

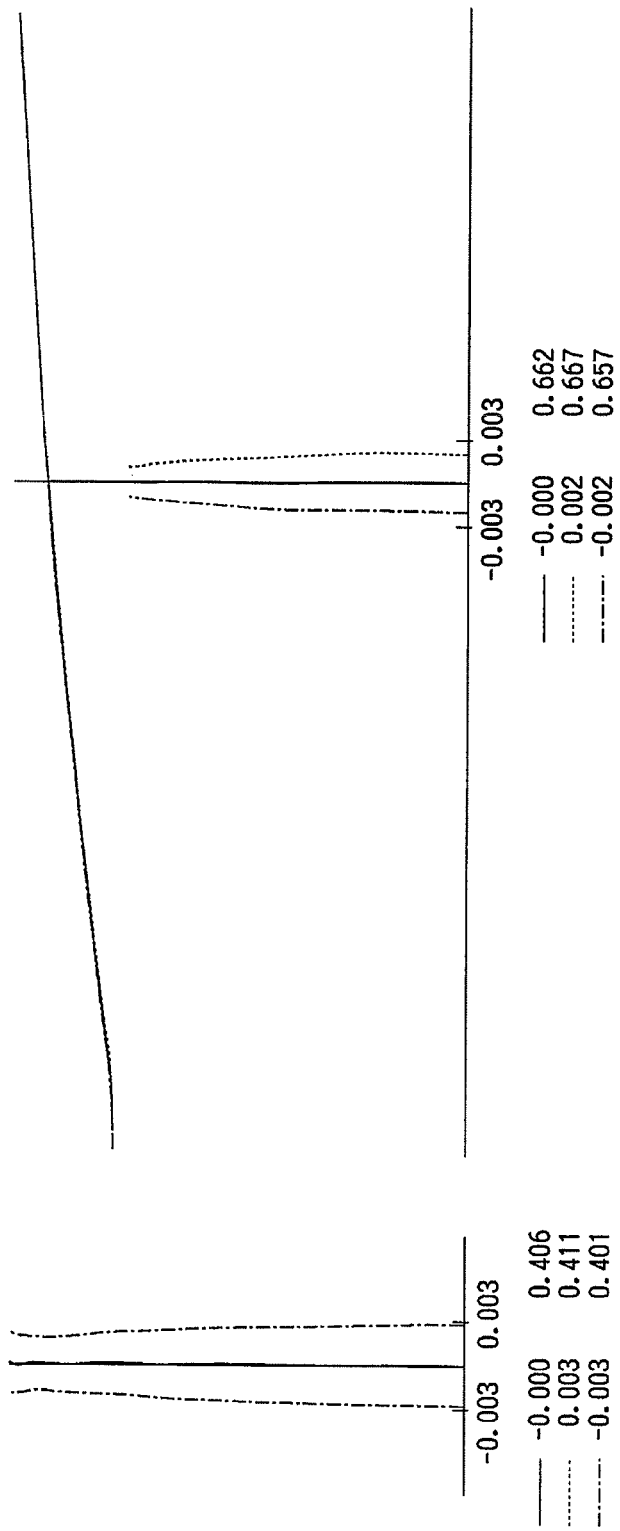

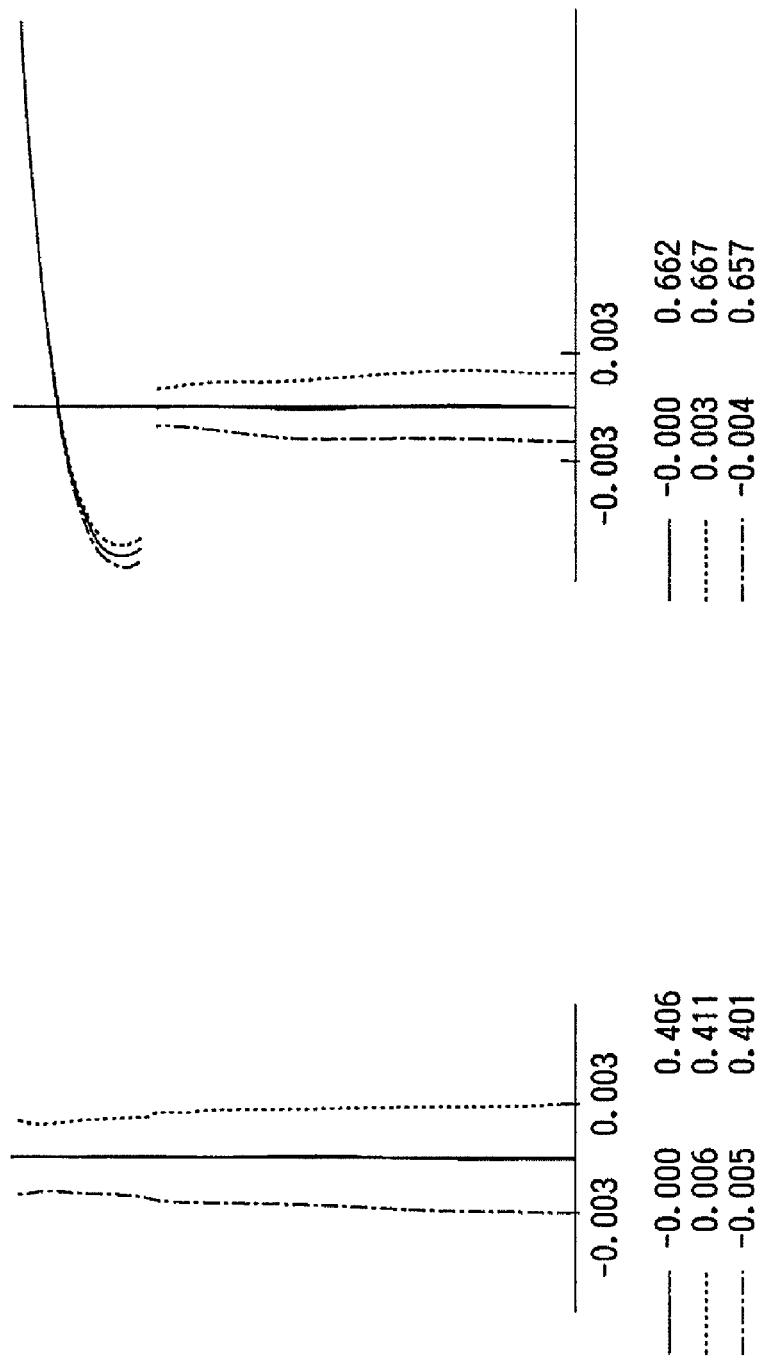

OPTICAL INFORMATION RECORDING/REPRODUCING APPARATUS AND OBJECTIVE LENS FOR THE SAME

BACKGROUND OF THE INVENTION

The present invention relates to an objective lens for an optical information recording/reproducing apparatus configured to record information to and/or reproduce information from a plurality of types of optical discs based on different standards, and to an optical information recording/reproducing apparatus on which such an objected lens is mounted.

There exist various standards of optical discs, such as DVD (Digital Versatile Disc) and BD (Blu-ray Disc), differing in recording density, protective layer thickness, etc. Therefore, an objective optical system mounted on the optical information recording/reproducing apparatus is required to have a compatibility with a plurality of types of optical discs. In this case, the term "compatibility" means to guarantee realizing information recording and information reproducing without the need for replacement of components even when the optical disc being used is changed. Incidentally, in this specification, the "optical information recording/reproducing apparatuses" include apparatuses for both information reproducing and information recording, apparatuses exclusively for information reproducing, and apparatuses exclusively for information recording.

In order to have the compatibility with the plurality of types of optical discs based on the different standards, the objective optical system needs to correct the spherical aberration which changes depending on the difference in protective layer thickness (i.e., an optical distance between a recording surface and a surface of a protective layer of an optical disc) between the optical discs and to form a suitable beam spot in accordance with the difference in recording density between the optical discs, by changing the numerical aperture NA of the objective optical system. In general, the size of the beam spot becomes smaller, as the wavelength of a laser beam becomes shorter. For this reason, the optical information recording/reproducing apparatus is configured to selectively use one of a plurality of types of laser beams having different wavelengths in accordance with the recording density of the optical disc being used. The optical information recording/reproducing apparatus uses, for example, light having the wavelength of approximately 660 nm (i.e., so-called red laser light) for information recording or information reproducing for DVD, and light having the wavelength of approximately 405 nm (i.e., so-called blue laser light) for information recording or information reproducing for BD.

Japanese Patent Provisional Publications No. 2000-81566A (hereafter, referred to as JP2000-81566A), No. 2004-265573A (hereafter, referred to as JP2004-265573A) and No. 2004-326862A (hereafter, referred to as JP2004-326862A) disclose optical information recording/reproducing apparatuses having the compatibility with a plurality of types of optical discs. Specifically, JP2000-81566A discloses an optical information recording/reproducing apparatus having the compatibility with both of the standards of CD (Compact Disc) and DVD. Each of JP2004-265573A and JP2004-326862A discloses an optical information recording/reproducing apparatus having the compatibility with both of DVD and BD. As disclosed in each of JP2000-81566A, JP2004-265573A and JP2004-326862A, an objective lens for the optical information recording/reproducing apparatus is provided with a diffraction structure on one of surfaces of the objective lens to achieve the compatibility. The diffraction structure has a plurality of annular zones concentrically formed about an optical axis of the objective lens. The diffraction structure of this type has a plurality of regions in which diffraction structures having different blazed wavelengths are respectively formed in order to enhance the diffraction efficiency for each of a plurality of laser beams based on the different standards. Specifically, the diffraction structure has a first region contributing to convergence of each of the plurality of laser beams onto a recording surface of corresponding one of the plurality of optical discs, and a second region contributing only to convergence of the laser beam for a high recording density optical disc (i.e., DVD in the case of JP2000-81566A, and BD in the case of JP2004-265573A or JP2004-326862A).

Incidentally, when the compatibility with a plurality of optical discs based on different standards is provided for a single objective lens, there is a concern that the quality of a signal is deteriorated by flare light. For example, when CD is used in an optical system disclosed in JP2000-81566A (or when DVD is used in an optical system disclosed in JP2004-265573A or JP2004-326862A), principally two types of flare light including undesired diffraction order light in a first region and undesired light in a second region are caused. In order to suitably perform information recording or information reproducing for each optical disc, it is necessary to reduce the effect caused on a signal by the flare light.

However, regarding the optical information recording/reproducing apparatus disclosed in JP2000-81566A, there is a problem that, when the objective lens approaches CD under focus-servo-control, the undesired diffraction order light in the first region is converged on a recording surface of CD and thereby deteriorates the quality of a signal. On the other hand, regarding the optical information recording/reproducing apparatus disclosed in each of JP2004-265573A and JP2004-326862A, the absolute amount of undesired diffraction order light is small because the diffraction efficiency is increased for each of the plurality of laser beams based on the different standard. However, the optical information recording/reproducing apparatus disclosed in each of JP2000-81566A, JP2004-265573A and JP2004-326862A is designed to use different high orders of diffracted light respectively for the plurality of laser beams in order to enhance the diffraction efficiency. In this case, a problem arises that the height of each step in the diffraction structure becomes large, and therefore processing of a metal mold and molding for the objective lens becomes difficult.

SUMMARY OF THE INVENTION

The present invention is advantageous in that it provides an objective lens for an optical information recording/reproducing apparatus capable of suitably recording information to and/or reproducing information from a plurality of types of optical discs based on different standards, such as DVD and BD, and an optical information recording/reproducing apparatus on which such an objective lens is mounted.

According to an aspect of the invention, there is provided an objective lens for an optical information recording/reproducing apparatus for recording information to and/or reproducing information from two types of optical discs including first and second optical discs differing in recording density by selectively using two types of light beams including first and second light beams respectively having first and second wavelengths. The first light beam is a substantially collimated light beam, and the second light beam is one of a substantially collimated beam and a diverging light beam. When $\lambda 1$ (unit: nm) represents the first wavelength and $\lambda 2$ (unit: nm) represents the second wavelength, $\lambda 1$ and $\lambda 2$ satisfy conditions:

$390 < \lambda 1 < 420$; and $640 < \lambda 2 < 700$. When t1 (unit: mm) represents a protective layer thickness of the first optical disc for which information recording or information reproducing is performed by using the first light beam, and t2 (unit: mm) represents a protective layer thickness of the second optical disc for which information recording or information reproducing is performed by using the second light beam, t1 and t2 satisfy conditions: $0.05 < t1 < 0.15$; and $0.50 < t2 < 0.70$. When NA1 represents a numerical aperture required for the information recording or information reproducing for the first optical disc, and NA2 represents a numerical aperture required for the information recording or information reproducing for the second optical disc, NA1 and NA2 satisfy a condition: NA1>NA2.

In this configuration, at least one of optical surfaces of the objective lens comprises a diffraction surface having a diffraction structure defined by an optical path difference function:

$$\phi(h) = (P_2 \times h^2 + P_4 \times h^4 + P_6 \times h^6 + P_8 \times h^8 + P_{10} \times h^{10} + P_{12} \times h^{12}) m\lambda$$

where $P_2, P_4, P_6 \ldots$ represent coefficients of the $2^{nd}$ order, $4^{th}$ order, $6^{th}$ order, h represents a height from an optical axis, m represents a diffraction order at which a diffraction efficiency of an incident light beam is maximized, and $\lambda$ represents a design wavelength of the incident light beam. The diffraction surface has a first region contributing to converging the first light beam onto a recording surface of the first optical disc and converging the second light beam onto a recording surface of the second optical disc. The first region has a diffraction structure configured such that each of a diffraction order at which a diffraction efficiency is maximized for the first light beam and a diffraction order at which a diffraction efficiency is maximized for the second light beam is $1^{st}$ order. The diffraction surface has a second region located outside the first region. The second region is configured to contribute to converging the first light beam onto the recording surface of the first optical disc and not to contribute to convergence of the second light beam. When P2 represents a $2^{nd}$ order coefficient of the optical path difference function defining the diffraction structure in the first region, and f2 (unit: mm) represents a focal length of the objective lens with respect to a diffracted light beam of the second light beam having a diffraction order at which the diffraction efficiency is maximized for the second light beam passing through the first region, the objective lens satisfies a condition:

$$35 < P2 \times f2 < 200 \quad (1).$$

Since the diffraction order at which the diffraction efficiency is maximized in the first region is the 1st order (or another low order), it becomes possible to bring the undesired diffraction order light (e.g., the 0-th order diffracted light or the 2nd order diffracted light) to a position far from the position of the use diffraction order light. When n-th order diffracted light is used, the power difference between the n-th order diffracted light and the (n±1)-th order diffracted light caused as the undesired diffraction order light becomes the maximum since the power difference is defined by 1/n.

By satisfying the condition (1), it becomes possible to set the paraxial focal point of the undesired diffraction order light to sufficiently deviate from the focal point of the use diffraction order light, while effectively avoiding increase of the number of steps of the diffraction structure and increase of the chromatic aberration due to increase of the diffraction power. As a result, it becomes possible to suppress deterioration of signals by the undesired diffraction order light. When the intermediate term of the condition (1) gets smaller than the lower limit of the condition (1), it is impossible to set the paraxial focal point of the undesired diffraction order light to sufficiently deviate from the focal point of the use diffraction order light, and thereby it becomes impossible to suppress the deterioration of the signal caused by the undesired diffraction order light. When the intermediate term of the condition (1) gets larger than the upper limit of the condition (1), the number of steps of the diffraction structure increases and the chromatic aberration increases considerably due to increase of the diffraction power, which is disadvantageous in regard to manufacturing and the optical performance.

In at least one aspect, when $\lambda B1$ (unit: nm) represents a blazed wavelength in the first region, the objective lens may satisfy a condition:

$$450 < \lambda B1 < 550 \quad (2).$$

When the condition (2) is satisfied, the absolute amount of the undesired diffraction order light of the second light beam (having the wavelength $\lambda 2$) passing the first region is small. When the intermediate term of the condition (2) gets smaller than the lower limit of the condition (2), the diffraction efficiency of the use diffraction order light of the second light beam passing through the first region is too small to suitably performing the information recording or information reproducing for the second optical disc. When the intermediate term of the condition (2) gets larger than the upper limit of the condition (2), the diffraction efficiency of the use diffraction order light of the first light beam (having the wavelength $\lambda 1$) passing through the first region becomes too small to suitably performing the information recording or information reproducing for the first optical disc. Specifically, since the diffraction efficiency is small, it is difficult to support the high-speed recording (or high-speed reproducing). In order to compensate for decrease of the diffraction efficiency, it is necessary to employ a high output light source, which is undesirable in regard to cost. In this a problem arises that the S/N ratio of a signal, such as a reproduction signal, decreases due to increase of the undesired diffraction order light.

According to another aspect of the invention, there is provided an objective lens which is configured to satisfy the condition (3) in place of satisfying the condition (1).

$$-0.010 < (\lambda B1 - \lambda 2)/(P2 \times f2 \times \lambda 2) < -0.001 \quad (3).$$

By satisfying the condition (3), it becomes possible to reduce the effect of the flare light. The denominator of the condition (3) becomes larger, as the distance between the focal point of the undesired diffraction order light and the focal point of the use diffraction order light increases. The numerator of the condition (3) becomes larger, as the intensity of the undesired diffraction order light increases. By achieving a balance between the focal point and the intensity of the undesired diffraction order light, it becomes possible to control and reduce the effect of the undesired diffraction order light. When the intermediate term of the condition (3) gets smaller than the lower limit of the condition (3), it is impossible to set the paraxial focal point of the undesired diffraction order light to sufficiently deviate from the focal point of the use diffraction order light or it is impossible to suppress deterioration of the signals due to the undesired diffraction order light because the intensity of the flare light is too large. When the intermediate term of the condition (3) gets larger than the upper limit of the condition (3), increase of the number of steps of the diffraction structure or increase of the chromatic aberration due to the increase of the diffraction power becomes remarkable, which is disadvantageous in regard to manufacturing and the optical performance.

In at least one aspect, the second region may have a diffraction structure configured to give a spherical aberration to the second light beam passing through the second region so that the second light beam passing through the second region is made into flare light. With this configuration, the second region is able to serve as an aperture stop for the second light beam having the wavelength λ2.

In at least one aspect, when λB2 (unit: nm) represents a blazed wavelength of the diffraction structure in the second region, the objective lens may satisfy a condition:

$$390 < \lambda B2 < 420 \quad (4).$$

When the condition (4) is satisfied, the diffraction efficiency of the first light beam having the wavelength λ1 in the second region becomes approximately 100%. When λB2 falls outside the range of the condition (4), the diffraction efficiency of the first light beam passing through the second region becomes too small to support the high-speed recording/reproducing and the S/N ratio of the signals such as a reproduction signal decreases due to increase of the undesired diffraction order light.

In at least one aspect, when n2 represents a refractive index of the objective lens with respect to the wavelength λ2, R1 represents a curvature radius of a light source side surface of the objective lens, and D represents a lens thickness of the objective lens on the optical axis, the objective lens may satisfy a condition:

$$f2 \times (1 + 2 \times P2 \times \lambda 2 - D \times (n2-1)/(n2 \times R1)) > 0.57 \quad (5).$$

By satisfying the condition (5), it becomes possible to secure an adequate working distance when the second optical disc is used. When the condition (5) is not satisfied, the working distance defined when the second optical disc is used becomes too short, and therefore there are concerns that fracture is caused by mechanical interfering between the objective lens and the second optical disc.

In at least one aspect, the objective lens may satisfy a condition:

$$70 < P2 \times f2 < 200 \quad (6).$$

With this configuration, deterioration of the signals by the undesired diffraction order light can be further suppressed.

In at least one aspect, when f1 represents a focal length (unit: mm) of the objective lens with respect to diffracted light having a diffraction order at which the diffraction efficiency is maximized for the first light beam, the objective lens may satisfy a condition:

$$1.0 < f1 < 1.6 \quad (7).$$

Satisfying the condition (7) is advantageous in regard to downsizing of the objective lens and securing the working distance for the first optical disc. When f1 gets smaller than the lower limit of the condition (7), it becomes difficult to secure an adequate working distance for the first optical disc. Furthermore, in this case a lens surface of the objective lens becomes small, and thereby manufacturing and handling of the objective lens become difficult. The state where f1 is larger than the upper limit of the condition (7) is inappropriate for downsizing of the objective lens.

In at least one aspect, a diffraction order at which the diffraction efficiency is maximized for the first light beam in the second region may be a $1^{st}$ order.

With this configuration, it is possible to suppress the maximum diffraction efficiency of the second light beam (having the wavelength λ2) in the second region while considering the easiness of manufacturing.

In at least one aspect, when MM2 represents a magnification of the objective lens with respect to the second light beam, the objective lens may satisfy a condition:

$$-0.020 < MM2 \leq 0.000 \quad (8).$$

Satisfying the condition (8) is advantageous in regard to downsizing of the objective lens and securing of an adequate working distance for the first optical disc. When MM2 gets smaller than the lower limit of the condition (8), the difference in magnification with respect to a magnification defined when the first optical disc is used becomes large, and therefore it becomes impossible to use the same collimator lens. When MM2 gets larger than the upper limit of the condition (8), it becomes difficult to secure a working distance when the second optical disc is used.

According another aspect of the invention, there is provided an optical information recording/reproducing apparatus for recording information to and/or reproducing information from two types of optical discs including first and second optical discs differing in recording density by selectively using two types of light beams including first and second light beams respectively having first and second wavelengths. The first light beam is a substantially collimated light beam, and the second light beam is a substantially collimated beam or a diverging light beam. The optical information recording/reproducing apparatus includes one of the above described objective lenses.

BRIEF DESCRIPTION OF THE
ACCOMPANYING DRAWINGS

FIG. 1 is a block diagram illustrating a general configuration of an optical information recording/reproducing apparatus according to an embodiment of the invention.

FIGS. 2A and 2B generally illustrate a configuration of an objective lens according to the embodiment.

FIGS. 5A and 5B show the spherical aberration of the use diffraction order light when optical discs D1 and D2 are used, respectively, in a first example.

FIGS. 7A and 7B show the spherical aberration of the use diffraction order light when optical discs D1 and D2 are used, respectively, in a second example.

FIGS. 10A and 10B show the spherical aberrations of the use diffraction order light and the undesired diffraction order light when the optical discs D1 and D2 are used, respectively, in the third example.

FIGS. 12A and 12B show the spherical aberrations of the use diffraction order light and the undesired diffraction order light when the optical discs D1 and D2 are used, respectively, in the fourth example.

FIGS. 14A and 14B show the spherical aberrations of the use diffraction order light and the undesired diffraction order light when the optical discs D1 and D2 are used, respectively, in the fifth example.

FIGS. 15A and 15B show the spherical aberration of the use diffraction order light when optical discs D1 and D2 are used, respectively, in a sixth example.

FIGS. 16A and 16B show the spherical aberrations of the use diffraction order light and the undesired diffraction order light when the optical discs D1 and D2 are used, respectively, in the sixth example.

FIGS. 17A and 17B show the spherical aberration of the use diffraction order light when optical discs D1 and D2 are used, respectively, in a seventh example.

FIGS. 19A and 19B show the spherical aberration of the use diffraction order light when optical discs D1 and D2 are used, respectively, in a eighth example.

FIGS. 21A and 21B show the spherical aberration of the use diffraction order light when optical discs D1 and D2 are used, respectively, in a ninth example.

FIGS. 25A and 25B show the spherical aberration of the use diffraction order light when optical discs D1 and D2 are used, respectively, in an eleventh example.

FIGS. 27A and 27B show the spherical aberration of the use diffraction order light when optical discs D1 and D2 are used, respectively, in a twelfth example.

DETAILED DESCRIPTION OF THE EMBODIMENTS

Hereinafter, an embodiment according to the invention is described with reference to the accompanying drawings.

In the following, of two types of optical discs, a high recording density optical disc, such as BD, is referred to as an optical disc D1, and an optical disc (e.g., DVD or DVD-R) having a recording density lower than BD is referred to as an optical disc D2.

When t1 (unit: mm) and t2 (unit: mm) respectively represent protective layer thicknesses of the optical discs D1 and D2, t1 and t2 satisfy the following relationship.

$$t1 < t2$$

Considering individual differences of products, the protective layer thicknesses t1 and t2 have values within the ranges indicated below.

$$0.05 < t1 < 0.15$$

$$0.50 < t2 < 0.70$$

In order to suitably perform information recording or information reproducing for each of the optical discs D1 and D2, it is necessary to change the numerical aperture NA so that a suitable beam spot can be obtained depending on the recording density on the optical disc being used. When NA1 and NA2 respectively represent optimal design numerical apertures for performing information recording or information reproducing respectively for the optical discs D1 and D2, NA1 and NA2 satisfy a following relationship.

$$NA1 > NA2$$

Specifically, when the optical disc D1 is used, NA is set for a higher value because in this case a beam spot smaller than that for the optical disc D2 is required. For example, NA1 is 0.85 and NA2 is 0.60.

As described above, in order to perform information recording or information reproducing for the optical discs D1 and D2 differing in recording density, laser beams having different wavelengths are used in an optical information recording/reproducing apparatus so that a suitable beam spot can be obtained depending on the recording density of the optical disc being used. Specifically, when the optical disc D1 is used, a laser beam having the wavelength $\lambda 1$ (unit: nm) is used to form a small beam spot on a recording surface of the optical disc D1. When the optical disc D2 is used, a laser beam having the wavelength $\lambda 2$ (unit: nm) which is longer than the wavelength $\lambda 1$ is used to form, on a recording surface of the optical disc D2, a beam spot which is larger than that for the optical disc D1. That is, the wavelengths $\lambda 1$ and $\lambda 2$ satisfy the following relationship.

$$\lambda 1 < \lambda 2$$

Considering the use environment and individual differences of products, $\lambda 1$ and $\lambda 2$ vary within the ranges defined below.

$$390 < \lambda 1 < 420$$

$$640 < \lambda 2 < 700$$

Figure 1:
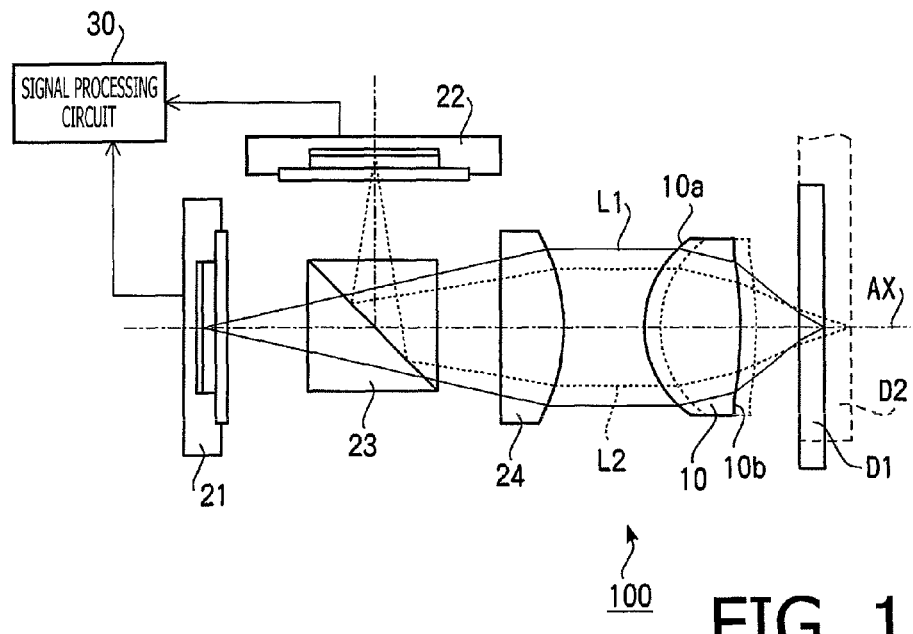

FIG. 1 is a block diagram generally illustrating a configuration of the optical information recording/reproducing apparatus 100 according to the embodiment. The optical information recording/reproducing apparatus 100 includes an objective lens 10, a BD module 21, a DVD module 22, a beam combiner 23 and a collimator lens 24. In FIG. 1, a chain line represents a reference axis AX of the optical information recording/reproducing apparatus 100. In a normal state, an optical axis of the objective lens 10 coincides with the reference axis AX. However, there is a case where the optical axis of the objective lens 10 shifts from the reference axis AX by a tracking operation in which the objective lens 10 is moved in a radial direction of an optical disc by a tracking mechanism.

In FIG. 1, a laser beam L1 indicated by a solid line represents a laser beam proceeding to the optical disc D1 or a returning laser beam returning from the optical disc D1, and a laser beam L2 indicated by a dotted lint represents a laser beam proceeding to the optical disc D2 or a returning laser beam returning from the optical disc D2. The objective lens 10 is arranged to be movable in the direction of the optical axis by a focus servo mechanism (not shown). A focus servo mechanism well known in the art may be employed. When the optical disc D1 is used, the objective lens 10 is moved to a position indicated by a solid line, and when the optical disc D2 is used, the objective lens 10 is moved to a position indicated by a dotted line.

Each of the BD module 21 and the DVD module 22 is an integrated device in which a semiconductor laser and a photoreceptor are integrally provided. The BD module 21 has the semiconductor laser which emits the laser beam L1 having the wavelength λ1, and the DVD module 22 has the semiconductor laser which emits the laser beam L2 having the wavelength λ2.

When the optical disc D1 is used, the BD module 21 is activated. The laser beam L1 emitted by the BD module 21 is incident on the collimator lens 24 via the beam combiner 23. The collimator lens 24 converts the incident laser beam L1 into a collimated beam so that the collimated beam is incident on the objective lens 10. The objective lens 10 converges the laser beam L1 in the vicinity of a recording surface of the optical disc D1. The converged laser beam L1 forms a beam spot on the recording surface of the optical disc D1. The laser beam L1 reflected from the optical disc D1 returns along the same optical path along which the laser beam L1 proceeds toward the optical disc D1, and is received by the photoreceptor provided in the BD module 21.

When the optical disc D2 is used, the DVD module 22 is activated. The laser beam L2 emitted by the DVD module 22 is incident on the collimator lens 24 after the optical path of the laser beam L2 is bent by the beam combiner 23. As in the case of the laser beam L1, the collimator lens 24 converts the incident laser beam L2 into a collimated beam so that the collimated beam is incident on the objective lens 10. The objective lens 10 converges the laser beam L2 in the vicinity of a recording surface of the optical disc D2. The converged laser beam L2 forms a beam spot on the recording surface of the optical disc D2. The laser beam L2 reflected from the optical disc D2 returns along the same optical path along which the laser beam L2 proceeds toward the optical disc D2, and is received by the photoreceptor provided in the DVD module 22.

Each of the photoreceptors provided in the BD module 21 and the DVD module 22 detects the returning laser beam and outputs signals to a signal processing circuit 30. A signal processing circuit for an optical pickup having a configuration well know in the art may be employed as the signal processing circuit 30. Based on the outputs from each photoreceptor, the signal processing circuit 30 detects various signals, such as a focusing error signal, a tracking error signal, and a reproduction signal representing information recorded on the optical disc being used. As described above, the collimated laser beam is incident on the objective lens 10 when each of the optical discs D1 and D2 is used. Therefore, even when the objective lens 10 is shifted by a minute amount in the direction perpendicular to the optical axis by the tracking operation (a so-called tracking shift), no off-axis aberration, such as a coma, is caused.

As described above, in this embodiment, an optical system is formed as an infinite optical system where a collimated beam is incident on an objective lens for each optical disc. However, in another embodiment, the optical information recording/reproducing apparatus 100 may employ a finite optical system in which a diverging laser beam having a low degree of divergence is incident on the objective lens D2. When such a finite optical system is employed, the optical information recording/reproducing apparatus 100 is configured to satisfy the following condition (8):

$$-0.020 < MM2 \leqq 0.000 \tag{8}$$

where MM2 represents a magnification of the objective lens 10 with respect to the laser beam L2.

Incidentally, the amount of spherical aberration changes depending on the difference in protective layer thickness between the optical discs D1 and D2. For example, if the optical information recording/reproducing apparatus 100 is configured to be optimized for the optical disc D1, the spherical aberration becomes an overcorrected condition during use of the optical disc D2 because of the difference in protective layer thickness, which is not suitable for information recording or information reproducing for the optical disc D2. On the other hand, if the optical information recording/reproducing apparatus 100 is configured to be optimized for the optical disc D2, the spherical aberration becomes an undercorrected condition during use of the optical disc D1 because of the difference in protective layer thickness, which is not suitable for information recording or information reproducing for the optical disc D1. In order to configure the optical information recording/reproducing apparatus 100 to have the compatibility with the optical discs D1 and D2 (i.e., to guarantee the information recording or information reproducing for each of the optical discs D1 and D2), it is required to suitably correct the spherical aberration for each of the optical discs D1 and D2. It is also required to form a beam spot having a suitable spot size corresponding to the recording density (a pit size) of each optical disc so that an S/N ratio of each signal (e.g. the reproduction signal) can be enhanced. In order to satisfy such requirements, the objective lens 10 according to the embodiment is configured as follows.

Figures 2A, 2B:
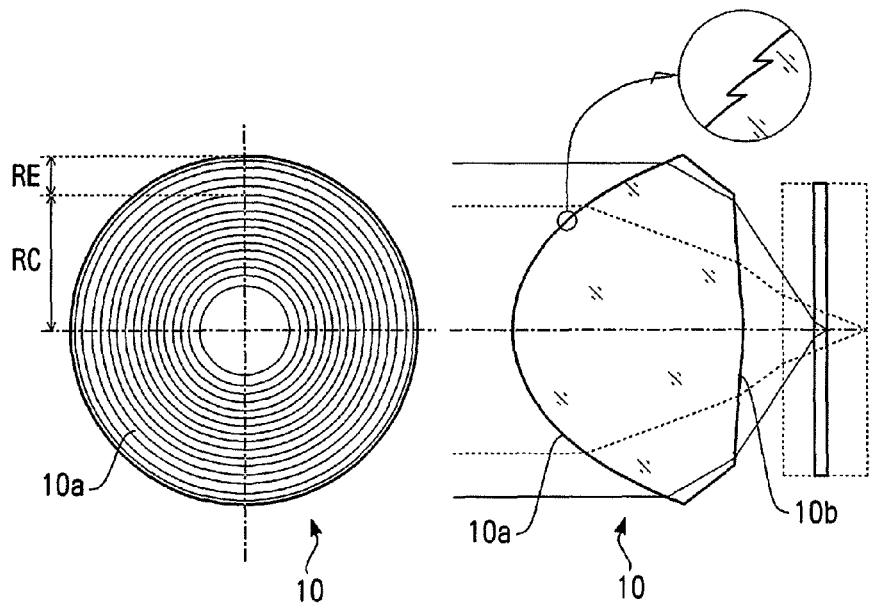

FIG. 2A is a front view of the objective lens 10, and FIG. 2B s a side cross section of the objective lens 10. As described above, the objective lens 10 is mounted on an optical head of the optical information recording/reproducing apparatus 100 having the compatibility with the plurality of types of optical discs based on different standards (i.e., the optical discs D1 and D2), and the objective lens 10 has the function of converging each of the laser beams (L1 and L2) having different wavelengths emitted from the semiconductor lasers (21 and 22) onto the recording surface of corresponding one of the plurality of types of optical discs (D1 and D2).

The objective lens 10 is a biconvex single element lens made of resin, and has a first surface 10a facing the collimator lens 24 and a second surface 10b facing the optical disc. Each of the first and second surfaces 10a and 10b of the objective lens 10 is an aspherical surface. A shape of an aspherical surface is expressed by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), κ is a conical coefficient, and $A_4, A_6, \ldots$ represent aspherical coefficients larger than or equal to the fourth order. By forming each surface of the objective lens 10 as an aspherical surface, it becomes possible to appropriately control the various aberrations (e.g., the spherical aberration and the coma).

As shown in FIG. 2A, the first surface 10a of the objective lens 10 includes a circular first region RC whose center coincides with the position of the optical axis, and a ring-shaped second region RE located outside the first region RC. In the entire region including the first and second regions RC and RE, an annular zone structure is formed. As shown in FIG. 2A and a circled enlarged illustration in FIG. 2B, the annular zone structure includes a plurality of refractive surface zones (annular zones) which are formed concentrically about the optical axis, and minute steps each of which is formed, between adjacent ones of the plurality of refractive surface zones, to extend in parallel with the optical axis of the objective lens 10. In this embodiment, the annular zone structure is formed on the first surface 10a of the objective lens 10. However, in another embodiment, the annular zone structure may be provided only on the second surface 10b of the objective lens 10, or may be provided on both of the first and second surfaces 10a and 10b of the objective lens 10.

By providing the annular zone structure only on the first surface 10a of the objective lens 10, the following advantages can be achieved. For example, it becomes possible to increase the minimum annular zone width of the annular zone structure. In this case, loss of light amount by each step portion with respect to an effective beam width can be suppressed. Since the first surface 10a on which the annular zone structure is formed does not face the optical disc, dust is not adhered to the annular zone structure of the first surface 10a of the objective lens 10. Furthermore, even when the objective lens 10 is brushed with a lens cleaner, the annular zone structure is not worn.

Each step of the annular zone structure is formed to cause a predetermined optical path length difference between a light beam passing through the inside of a boundary (i.e., a step between adjacent ones of the annular zones) and a light beam passing through the outside of the boundary. In general, such an annular zone structure can be expressed as a diffraction structure. The annular zone structure formed such that the predetermined optical path length difference is n-times (n: integer) as large as a particular wavelength λα can be expressed as an n-th order diffraction structure having the blazed wavelength λα. A diffraction order of diffracted light, at which the diffraction efficiency is maximized when a light beam having a particular wavelength λβ passes through the diffraction structure, can be obtained as an integer m which is closest to a value defined by dividing an optical path length difference given to the light beam having the wavelength λβ by the wavelength λβ.

Besides, the fact that an optical path length difference is caused between a light beam passing through the inside of a boundary (formed between adjacent ones of the annular zones) and a light beam passing through the outside of the boundary can be considered as a phenomenon that phases of the light beams are shifted with respect to each other by the effect of each step of the annular zone structure. Therefore, the annular zone structure can be expressed as a structure for shifting phases of incident light beams (i.e., a phase shift structure).

The annular zone structure can be expressed by an optical path difference function φ(h). The optical path difference function φ(h) is a function representing the functional capability of the objective lens 10 (a diffraction lens) in a form of an additional optical path length at the height h from the optical axis of the objective lens 10. The optical path difference function φ(h) can be expressed by a following equation:

$$\phi i(h) = (P_2 \times h^2 + P_4 \times h^4 + P_6 \times h^6 + P_8 \times h^8 + P_{10} \times h^{10} + P_{12} \times h^{12})m\lambda$$

where $P_2, P_4, P_6 \ldots$ represent coefficients of the $2^{nd}$ order, $4^{th}$ order, $6^{th}$ order, h represents a height from the optical axis, m represents a diffraction order at which the diffraction efficiency of the incident laser beam is maximized, and λ represents a design wavelength of the laser beam being used.

The annular zone structure formed in the first region RC contributes to convergence of each of the laser beams L1 and L2. Specifically, the annular zone structure in the first region RC is configured to converge the laser beam L1 onto the recording surface of the optical disc D1 and converge the laser beam L2 onto the recording surface of the optical disc D2. When the annular zone structure formed in the first region RC is regarded as a diffraction structure, the annular zone structure is configured such that the diffraction orders at which the diffraction efficiencies are maximized respectively for the laser beams L1 and L2 are the first orders.

By forming the first region RC such that the first order diffracted light is used for each of the laser beams L1 and L2, it becomes possible to achieve a balance between the diffraction efficiency for the laser beam L1 and the diffraction efficiency for the laser beam L2. That is, it becomes possible to effectively avoid occurrence of a problem that one of the diffraction efficiencies for the laser beams L1 and L2 becomes too low. Furthermore, in this case, since a required additional optical path length is small, each step can be formed to be low, and therefore processing of a metal mold and molding become easy.

However, in compensation for achieving the balance between the diffraction efficiencies for the laser beams L1 and L2, it becomes impossible to avoid occurrence of undesired diffraction order light. The undesired diffraction order light of this type might converge at the recording surface of the optical disc being used and thereby deteriorate the signals. In particular, the principal undesired diffraction order light (i.e., the diffraction order light having the second largest diffraction efficiency) of the laser beam L2 which has passed through the first region RC tends to deteriorate the signals.

For this reason, the objective lens 10 is configured to satisfy a condition:

$$35 < P2 \times f2 < 200 \qquad (1)$$

where P2 represents the $2^{nd}$ order coefficient of the optical path difference function defining the diffraction structure in the first region RC, and f2 represents the focal length (unit: mm) of the objective lens 10 with respect to the laser beam L2 passing through the first region RC. Unless otherwise noted, the term "focal length" as used herein means "a focal length with respect to the diffracted light having the diffraction order at which the diffraction efficiency is maximized". For example, f2 is the focal length of the objective lens 10 with respect to the diffracted light having the diffraction order at which the diffraction efficiency is maximized for the laser beam L2 passing through the first region RC. Hereafter, a focal point corresponding to the focal length with respect to the diffracted light having the diffraction order at which the diffraction efficiency is maximized is expressed as "normal focal point". In this specification, the words "diffracted light having the diffraction order at which the diffraction efficiency is maximized" are synonymous with the words "use diffraction order light".

Let us consider that f2' represents the focal length (unit: mm) of the objective lens 10 with respect to the diffracted light having the diffraction order exhibiting the second largest diffraction efficiency of all the diffracted light of the laser beam L2 which has passed through the first region RC, and Δf2 (=f2−f2') represents the difference (unit: mm) between the focal length f2 and the focal length f2'. The difference Δf2 represents, as a numeric value, how long the paraxial focal point of the undesired diffraction order light having the largest diffraction efficiency of all of the undesired diffraction order light is away from the normal focal point in the direction of the optical axis. In the following, for the sake of convenience, the undesired diffraction order light having the largest diffraction efficiency of all of the undesired diffraction order light is referred to as "principal undesired diffraction order light", and the difference Δf2 is referred to as a "flare light distance".

In order to prevent the objective lens 10 from fracturing by mechanically interfering with the optical disc being used, the objective lens 10 is held at a position which is sufficiently away from the optical disc being used while the focus servo is OFF. When the focus servo is turned ON, the objective lens 10 approaches the optical disc so that the normal focal point coincides with the recoding surface of the optical disc. In this case, if the focal length f2' is longer than the focal length f2, a problem arises that the principal undesired diffraction order light converges on the recording surface of the optical disc D2 before the normal focal point coincides with the recording surface of the optical disc D2. However, as long as the condition (1) is satisfied, the coefficient P2 has a positive value. Since the coefficient P2 has a positive value, the focal length f2' is shorter than the focal length f2. That is, the principal undesired diffraction order light converges at a point closer to the objective lens 10 than a converged point of the use diffraction order light. Therefore, by satisfying the condition (1), it becomes possible to effectively avoid occurrence of the above described problem which could be caused when the objective lens 10 approaches the optical disc D2.

However, when the paraxial focal point of the principal undesired diffraction order light is close to the normal focal point, deterioration of signals by the principal diffraction order light cannot be sufficiently suppressed only by setting the focal length f2' to be smaller than the focal length f2. In order to prevent the deterioration of signals, it is necessary to separate the paraxial focal point of the principal undesired diffraction order light from the normal focal point by a predetermined distance or more. For example, considering an interlayer distance of approximately 0.04 mm of multilayer DVD, it is desirable that the paraxial focal point of the principal undesired diffraction order light is separated from the normal focal point by at least approximately 0.05 mm. When the paraxial focal point of the principal undesired diffraction order light is separated by approximately 0.05 mm from the normal focal point, a crosstalk between layers of the optical disc can be suppressed considerably. Of course, regarding a single-layer DVD, it is possible to suitably suppress deterioration of signals by the principal undesired diffraction order light when the paraxial focal point of the principal undesired diffraction order light is separated by approximately 0.05 mm from the normal focal point.

Figure 3:
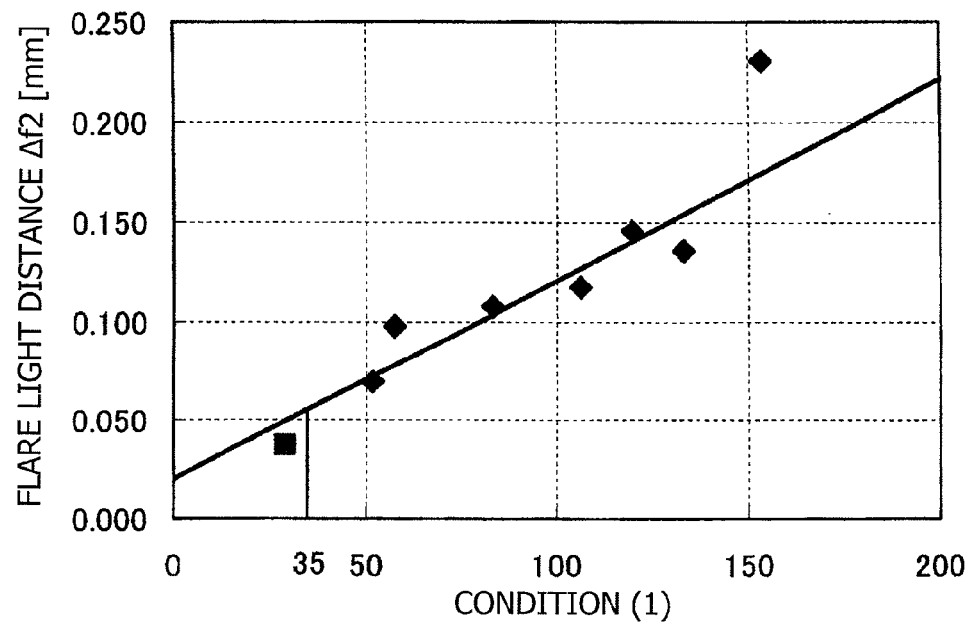
FIG. 3 shows a relationship between the flare light distance Δf2 and a condition (1).

FIG. 3 is a graph illustrating a relationship between the flare light distance Δf2 and the condition (1). In FIG. 3, the vertical axis represents the flare light distance Δf2, and the horizontal axis represents the value of the condition (1). As shown in FIG. 3, the value of the condition (1) is approximately proportional to the flare light distance Δf2. In FIG. 3, values obtained by applying configurations of first to twelfth examples and a comparative example (which are described later) to the condition (1) are plotted.

As shown in FIG. 3, when the value of the condition (1) exceeds 35, the flare light distance Δf2 becomes larger than or equal to 0.005 mm. That is, when the intermediate term of the condition (1) is larger than the lower limit of the condition (1), it is possible to separate the paraxial focal point of the principal undesired diffraction order light by 0.05 mm or more from the normal focal point in the direction of the optical axis, and therefore it becomes possible to suppress largely the deterioration of signals caused by the principal undesired diffraction order light. When the intermediate term of the condition (1) gets smaller than the lower limit of the condition (1), it becomes impossible to sufficiently separate the paraxial focal point of the principal undesired diffraction order light from the normal focal point, and thereby it becomes impossible to suppress the deterioration of signals caused by the principal undesired diffraction order light.

In order to set the value of the condition (1) to have a large value, a larger diffraction power is required. However, if the diffraction power is increased, increase of the number of steps of the diffraction structure and increase of the chromatic aberration are caused. Therefore, it is not appropriate to simply increase the diffraction power. When the intermediate term of the condition (1) gets larger than the upper limit of the condition (1), the number of steps of the diffraction structure increases considerably and the chromatic aberration increases considerably, which causes a great deal of disadvantages in regard to manufacturing and the optical performance.

The smaller the diffraction order at which the diffraction efficiency is maximized in the first region RC becomes, the design condition in regard to separating the paraxial focal point of the principal undesired diffraction order light from the normal focal point becomes more advantageous. When the diffraction order at which the diffraction efficiency is maximized is the n-th order, the power difference between the n-th order diffracted light and the (n±1)-th order diffracted light (which is caused as principal undesired light) is determined by 1/n. That is, the smaller the diffraction order of the use diffraction order light becomes, the larger the power difference between the use diffraction order light and the undesired diffraction order light becomes. In this embodiment, the first order diffracted light is selected as the use diffraction order light. Such a configuration is advantageous in regard to setting a focal point of the principal undesired diffraction order light (e.g., 0-th order light or $2^{nd}$ order light) to be more largely away from the normal focal point. In addition, in this case, the power of the use diffraction order light can be set to be large with respect to the power of the principal undesired diffraction order light.

In another embodiment, in place of satisfying the condition (1), the objective lens 10 may be configured to satisfy a following condition (3):

$$-0.010 < (\lambda B1 - 2)/(P2 \times f2 \times 2) < -0.001 \qquad (3)$$

where λB1 (unit: nm) represents the blazed wavelength of the diffraction structure in the first region RC.

By satisfying the condition (3), it becomes possible to suitably suppress the deterioration of signals caused by the undesired diffraction order light. When the intermediate term of the condition (3) gets smaller than the lower limit of the condition (3), it is impossible to sufficiently separate the paraxial focal point of the undesired diffraction order light from the focal point of the use diffraction order light, or the intensity of flare light becomes too strong to suppress the deterioration of signals caused by the undesired diffraction order light. When the intermediate term of the condition (3) gets larger than the upper limit of the condition (3), increase of the number of steps in the diffraction structure and increase of the chromatic aberration become remarkable, which is undesirable in regard to manufacturing and the optical performance.

In order to further suppress the deterioration of signals caused by the principal undesired diffraction order light, the objective lens 10 may be configured to satisfy a condition:

$$70 < P2 \times f2 < 200 \quad (6).$$

The annular zone structure provided in the second region RE contributes only to convergence of the laser beam L1. Specifically, the annular zone structure provided in the second region RE converges the laser beam L1 onto the recording surface of the optical disc D1, and produces largely the spherical aberration of the laser beam L2 to cause the flare light when the optical disc D2 is used so that the laser beam L2 is not converged on the recording surface of any of the optical discs D1 and D2. That is, the second region RE serves as an aperture stop for the laser beam L2. The annular zone structure provided in the second region RE is designed exclusively for the optical disc D1, and is configured such that the diffraction efficiency for the laser beam L1 becomes approximately 100%.

In order to reduce the absolute amount of the undesired diffraction order light of the laser beam L2 passing through the first region RC, the objective lens 10 is configured to satisfy a condition:

$$450 < \lambda B1 < 550 \quad (2).$$

The following Table 1 shows the relationship between the diffraction efficiency of the laser beam L1 passing through the first region RC (see a column "BD" in Table 1) and the diffraction efficiency of the laser beam L2 passing through the first region RC (see a column "DVD" in Table 1) in the case where the diffraction order of blazing is the 1st order. As shown in Table 1, when the condition (2) is satisfied, a diffraction efficiency larger than or equal to 65% is achieved for the laser beam L2 passing through the first region RC, and therefore the amount of undesired diffraction order light of the laser beam L2 is small. When the intermediate term of the condition (2) gets larger than the upper limit of the condition (2), the absolute amount of the undesired diffraction order light is small because in this case the diffraction efficiency of the laser beam L2 passing through the first region RC is high. However, in compensation for increasing the diffraction efficiency of the laser beam L2, the diffraction efficiency of the laser beam L1 becomes too small. When the intermediate term of the condition (2) gets smaller than the lower limit of the condition (2), the diffraction efficiency of the laser beam L2 passing through the first region RC becomes too small. In each of the above described cases not satisfying the condition (2), it becomes difficult to perform the high-speed recording/reproducing and the S/N ratio of a signal, such as a reproduction signal, decreases due to increase of the undesired diffraction order light.

TABLE 1

| | | Blazed Wavelength λB1 (nm) | | | | |
|---|---|---|---|---|---|---|
| | | 390 | 410 | 430 | 450 | 470 |
| Diffraction | BD | 99.5% | 99.9% | 98.2% | 94.7% | 89.4% |
| Efficiency | DVD | 52.0% | 57.6% | 63.1% | 68.5% | 73.6% |

| | | Blazed Wavelength λB1 (nm) | | | |
|---|---|---|---|---|---|
| | | 490 | 510 | 530 | 550 |
| Diffraction | BD | 82.8% | 74.9% | 66.3% | 57.2% |
| Efficiency | DVD | 78.4% | 82.9% | 87.0% | 90.6% |

When λB2 (unit: nm) represents the blazed wavelength of the diffraction structure in the second region RE, the objective lens 10 is configured to satisfy a condition:

$$390 < \lambda B2 < 420 \quad (4).$$

By satisfying the condition (4), the diffraction efficiency of the laser beam L1 in the second region RE which is a dedicated region for the optical disc D1 becomes approximately 100%. When λB2 falls outside the range of the condition (4), the diffraction efficiency of the laser beam L1 passing the second region RE decreases, and therefore it becomes difficult to perform the high speed recording/reproducing, and the S/N ratio of a signal, such as a reproduction signal, decreases due to increase of the undesired diffraction order light.

When n2 represents the refractive index of the objective lens 10 with respect to the wavelength λ2, R1 represents the curvature radius of the first surface 10a, and D represents the lens thickness of the objective lens 10, the objective lens 10 is configured to satisfy a condition:

$$f2 \times (1 + 2 \times P2 \times \lambda 2 - D \times (n2-1)/(n2 \times R1)) > 0.57 \quad (5).$$

Figure 4:
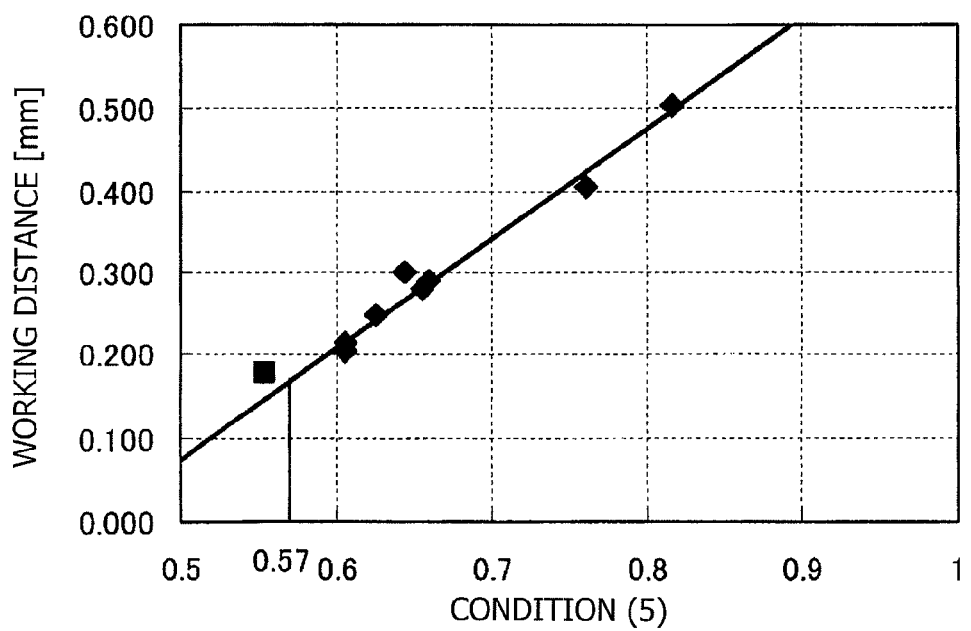
FIG. 4 shows a relationship between a working distance during use of an optical disc D2 and a condition (5).

FIG. 4 is a graph illustrating a relationship between the condition (5) and the working distance (unit: mm) defined when the optical disc D2 is used. In FIG. 4, the vertical axis represents the working distance defined when the optical disc D2 is used, and the horizontal axis represents the value of the condition (5). As can be seen from FIG. 4, the working distance defined when the optical disc D2 is used is substantially proportional to the value of the condition (5). It should be noted that, in FIG. 4, values obtained by applying the configurations of the first to twelfth examples and the comparative example (which are described later) to the condition (5) are plotted.

As shown in FIG. 4, when the condition (5) is satisfied, the working distance approximately 0.200 mm or more can be secured for the optical disc D2. When the condition (5) is not satisfied, the working distance defined when the optical disc D2 is used becomes too short, and therefore there are concerns that the objective lens 10 fractures by mechanical interfering with the optical disc D2.

When f1 represents the focal length (unit: mm) of the objective lens 10 with respect to the laser beam L1, the objective lens 10 is configured to satisfy a condition:

$$1.0 < f1 < 1.6 \quad (7).$$

Satisfying the condition (7) is advantageous in regard to downsizing of the objective lens 10 and securing the working distance for the optical disc D1. When f1 gets smaller than the lower limit of the condition (7), it becomes difficult to secure an adequate working distance for the optical disc D1. The state where f1 is larger than the upper limit of the condition (7) is inappropriate for downsizing of the objective lens 10.

The following Table 2 shows how the largest diffraction efficiency and the second largest diffraction efficiency of the laser beam L2 change when the second region RE is configured to be the n-th diffraction structure of the blazed wavelength λB2. In Table 2, the upper column shows the largest diffraction efficiency of the laser beam L2, and the lower column shows the second largest diffraction efficiency of the laser beam L2. The value in parentheses represents a corresponding diffraction order. In the example shown in Table 2, the blazed wavelength λB2 is 406 nm, and the n-th order is the diffraction order at which the diffraction efficiency is maximized for the laser beam L1 passing through the second region RE. The n-th order can be selected from among the first to seventh orders. When the second region RE is designed to be the $1^{st}$ order, $4^{th}$ order or $6^{th}$ order diffraction structure, the laser beam L2 can be divided into a plurality of diffracted light beams. When the second region RE is configured such that the aberration is caused largely for the laser beam L2 at a diffraction order at which the diffraction efficiency for the laser beam L2 is high, the laser beam L2 in the second region RE can be made into flare light regardless of the aberration of the other order diffracted light of the laser beam L2, by setting the diffraction order at which the diffraction efficiency of the laser beam L1 is maximized for the $2^{nd}$ order, $3^{rd}$ order, $5^{th}$ order or $6^{th}$ order. However, the diffraction structure having an excessively high diffraction order has a disadvantage that processing of a metal mold and molding become difficult. Considering such a problem, in this embodiment, the objective lens 10 is configured such that the diffraction order at which the diffraction efficiency is maximized for the laser beam L1 passing through the second region RE is the first order.

TABLE 2

|  | BD Diffraction Order | | | | | | |
|---|---|---|---|---|---|---|---|
|  | 1 | 2 | 3 | 4 | 5 | 6 | 7 |
| DVD Diffraction Efficiency (order) | 56.4%(1) | 88.8%(1) | 85.6%(2) | 60.9%(2) | 99.8%(3) | 51.8%(4) | 91.6%(4) |
| DVD Diffraction Efficiency (order) | 26.2%(0) | 4.8%(2) | 6.5%(1) | 22.6%(3) | 0.1%(2) | 30.2%(3) | 3.5%(5) |

In the following, twelve concrete examples (first to twelfth examples) of the optical information recording/reproducing apparatus 100 on which the objective lens 10 is mounted are explained. The optical information recording/reproducing apparatus 100 according to each of the first to twelfth examples has the general configuration shown in FIG. 1. The objective lens 10 according to each of the first to twelfth examples has the general configuration shown in FIGS. 2A and 2B. Since the shapes of the objective lenses 10 defined by numeric data according to the first to twelfth examples are similar to each other, the configuration of the objective lens 10 according to each of the first to twelfth examples is explained with reference to FIGS. 2A and 2B.

FIRST EXAMPLE

Hereafter, a first example of the optical information recording/reproducing apparatus 100 is described. The specifications of the objective lens 10 mounted on the optical information recording/reproducing apparatus 100 according to the first example are indicated in the following Table 3. Specifically, Table 3 shows the use wavelength, the focal length, NA and the magnification of the objective lens 10. Various definitions regarding Tables in the first example are also applied to Tables in the other examples and a comparative example.

TABLE 3

| Wavelength (nm) | 406 | 662 |
|---|---|---|
| Focal Length (mm) | 1.41 | 1.50 |
| NA | 0.85 | 0.60 |
| Magnification | 0.000 | 0.000 |

As shown by the magnification in Table 3, in the optical information recording/reproducing apparatus 100, each of the laser beams used for the respective optical discs D1 and D2 is incident on the objective lens 10 as a collimated beam. Therefore, it is possible to prevent the off-axis aberrations from occurring when the objective lens 10 is shifted for the tracking operation.

The following Table 4 shows a numeral configuration of the optical information recording/reproducing apparatus 100 defined when each of the optical discs D1 and D2 is used.

TABLE 4

| Surface No. | r | d(406 nm) | n(406 nm) | d(662 nm) | n(662 nm) | |
|---|---|---|---|---|---|---|
| 1-1 | 0.880 | 1.60 | 1.55903 | 1.60 | 1.53927 | Objective Lens |
| 1-2 | 0.886 | | | | | |
| 2 | −1.876 | 0.50 | | 0.28 | | |
| 3 | ∞ | 0.0875 | 1.62096 | 0.6000 | 1.57838 | Optical Disc |
| 4 | ∞ | — | | — | | |

In Table 4, the surface #1-1 represents the first region RC of the first surface 10a of the objective lens 10, the surface #1-2 represents the second region RE of the first surface 10a of the objective lens 10, the surface #2 represents the second surface 10b of the objective lens 10, the surface #3 represents a surface of a protective layer of each optical disc, and the surface #4 represents the recording surface of each optical disc. In Table 4, "r" denotes the curvature radius (unit: mm) of each optical surface, "d (406 nm)" denotes the thickness of an optical component or the distance (unit: mm) from each optical surface to the next optical surface with respect to the wavelength λ1, "n (406 nm)" represents the refractive index of each optical element with respect to the wavelength λ, "d (662 nm)" denotes the thickness of an optical component or the distance (unit: mm) from each optical surface to the next optical surface with respect to the wavelength λ2, "n (662 nm)" represents the refractive index of each optical element with respect to the wavelength λ2. For an aspherical surface, "r" represents the curvature radius on the optical axis.

Each of the first region RC (surface #1-1), the second region RE (surface #1-2) and the second surface 10b (surface 32) is an aspherical surface. Each of the aspherical surfaces is optimally designed for the information recording or information reproducing for each of the optical discs D1 and D2. The following Table 5 shows the conical coefficients κ and aspherical coefficients $A_4$, $A_6$ . . . of each aspherical surface. In Table 5, the notation "E" means the power of 10 with an exponent specified by the number to the right of E (e.g. "E-04" means "$\times 10^{-4}$").

TABLE 5

| | Surface No. | | |
|---|---|---|---|
| | 1-1 | 1-2 | 2 |
| κ | −8.50000E−01 | −8.50000E−01 | −3.80000E+01 |
| $4^{th}$ order | 4.57300E−02 | 4.98400E−02 | 2.42800E−01 |
| $6^{th}$ order | 1.25500E−02 | 2.06900E−02 | −2.80900E−01 |
| $8^{th}$ order | 2.19400E−02 | −2.15900E−03 | 7.62500E−02 |
| $10^{th}$ order | −2.60400E−02 | 1.10700E−02 | 4.52400E−02 |
| $12^{th}$ order | 2.76800E−02 | 1.14700E−02 | −1.17600E−02 |
| $14^{th}$ order | −1.07400E−02 | −1.32600E−02 | −2.05200E−02 |
| $16^{th}$ order | 0.00000E+00 | −2.50000E−03 | −5.48200E−03 |
| $18^{th}$ order | 0.00000E+00 | 5.37700E−03 | 1.51500E−02 |
| $20^{th}$ order | 0.00000E+00 | 3.29500E−03 | −5.59100E−03 |
| $22^{nd}$ order | 0.00000E+00 | −3.28800E−03 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

On each of the first region RC and the second region RE, the annular zone structure is formed. The following Table 6 shows coefficients of the optical path difference functions respectively defining the annular zone structures in the regions RC and RE on the first surface 10a of the objective lens 10.

TABLE 6

| | Surface No. | |
|---|---|---|
| | 1-1 | 1-2 |
| Diffraction order | 1/1 | 1 |
| $2^{nd}$ order | 5.53000E+01 | 5.00000E+01 |
| $4^{th}$ order | −1.70700E+01 | −1.00000E+01 |
| $6^{th}$ order | −2.90700E+00 | −3.00000E+00 |
| $8^{th}$ order | −8.20000E−01 | −7.00000E−01 |
| $10^{th}$ order | −3.15300E+00 | 0.00000E+00 |
| $12^{th}$ order | 0.00000E+00 | 0.00000E+00 |

In Table 6, the "diffraction order" defined for the first region RC (surface #1-1) represents the use diffraction order light for each of the optical discs D1 (BD) and D2 (DVD), and the "diffraction order" defined for the second region RE (surface #1-2) represents the use diffraction order for the optical disc D1 (BD). Specifically, in Table 6, the diffraction order "1/1" represents that the diffraction orders at which the diffraction efficiencies are maximized respectively for the laser beams L1 and L2 are the first orders, and the diffraction order "1" represents that the diffraction order at which the diffraction efficiency is maximized for the laser beam L1 is the first order. The undesired diffraction order light caused in each of the first region RC and the second region RE when the optical disc D1 is used is (n±1)-th order diffracted light (i.e., the 0th order and $2^{nd}$ order diffracted light). The diffraction orders of the undesired diffraction order light caused in the first region RC when the optical disc D2 is used are the 0th order and the $2^{nd}$ order. All of the diffracted light beams caused when the laser beam passes through the second region RE during use of the optical disc D2 are undesired light.

SECOND EXAMPLE

Hereafter, a second example of the optical information recording/reproducing apparatus 100 is described. The specifications of the objective lens 10 mounted on the optical information recording/reproducing apparatus 100 according to the second example are indicated in the following Table 7.

TABLE 7

| Wavelength (nm) | 406 | 662 |
|---|---|---|
| Focal Length (mm) | 1.41 | 1.49 |
| NA | 0.85 | 0.60 |
| Magnification | 0.000 | 0.000 |

The following Table 8 shows a numeral configuration of the optical information recording/reproducing apparatus 100 defined when each of the optical discs D1 and D2 is used.

TABLE 8

| Surface No. | r | d(406 nm) | n(406 nm) | d(662 nm) | n(662 nm) | |
|---|---|---|---|---|---|---|
| 1-1 | 0.896 | 1.60 | 1.55903 | 1.60 | 1.53927 | Objective |
| 1-2 | 0.902 | | | | | Lens |
| 2 | −1.933 | 0.50 | | 0.25 | | |
| 3 | ∞ | 0.0875 | 1.62096 | 0.6000 | 1.57838 | Optical |
| 4 | ∞ | — | | — | | Disc |

The following Table 9 shows the conical coefficients κ and aspherical coefficients $A_4, A_6 \ldots$ of each aspherical surface.

TABLE 9

| | Surface No. | | |
|---|---|---|---|
| | 1-1 | 1-2 | 2 |
| κ | −8.50000E−01 | −8.50000E−01 | −4.10000E+01 |
| $4^{th}$ order | 4.55200E−02 | 5.04200E−02 | 2.36600E−01 |
| $6^{th}$ order | 1.02000E−02 | 1.95700E−02 | −2.75700E−01 |
| $8^{th}$ order | 1.96000E−02 | 7.27300E−04 | 7.17700E−02 |
| $10^{th}$ order | −2.39100E−02 | 4.54600E−03 | 4.68300E−02 |
| $12^{th}$ order | 2.50100E−02 | 1.64600E−02 | −1.09400E−02 |
| $14^{th}$ order | −1.01400E−02 | −1.35400E−02 | −2.14000E−02 |
| $16^{th}$ order | 0.00000E+00 | −4.05600E−03 | −6.09800E−03 |
| $18^{th}$ order | 0.00000E+00 | 5.38000E−03 | 1.55900E−02 |
| $20^{th}$ order | 0.00000E+00 | 3.82700E−03 | −5.48100E−03 |
| $22^{nd}$ order | 0.00000E+00 | −3.38300E−03 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 10 shows coefficients of the optical path difference functions respectively defining the annular zone structures in the regions RC and RE on the first surface 10a of the objective lens 10.

TABLE 10

| | Surface No. | |
|---|---|---|
| | 1-1 | 1-2 |
| Diffraction order | 1/1 | 1 |
| $2^{nd}$ order | 3.51200E+01 | 3.00000E+01 |
| $4^{th}$ order | −1.80000E+01 | −1.00000E+01 |
| $6^{th}$ order | −6.28000E+00 | −3.00000E+00 |
| $8^{th}$ order | −1.00000E−01 | −7.00000E−01 |
| $10^{th}$ order | −3.84400E+00 | 0.00000E+00 |
| $12^{th}$ order | 0.00000E+00 | 0.00000E+00 |

THIRD EXAMPLE

Hereafter, a third example of the optical information recording/reproducing apparatus 100 is described. The specifications of the objective lens 10 mounted on the optical information recording/reproducing apparatus 100 according to the third example are indicated in the following Table 11.

TABLE 11

| Wavelength (nm) | 406 | 662 |
|---|---|---|
| Focal Length (mm) | 1.41 | 1.52 |
| NA | 0.85 | 0.60 |
| Magnification | 0.000 | 0.000 |

The following Table 12 shows a numeral configuration of the optical information recording/reproducing apparatus 100 defined when each of the optical discs D1 and D2 is used.

TABLE 12

| Surface No. | r | d(406 nm) | n(406 nm) | d(662 nm) | n(662 nm) | |
|---|---|---|---|---|---|---|
| 1-1 | 0.862 | 1.65 | 1.55903 | 1.65 | 1.53927 | Objective |
| 1-2 | 0.861 | | | | | Lens |
| 2 | −1.728 | 0.49 | | 0.29 | | |
| 3 | ∞ | 0.0875 | 1.62096 | 0.6000 | 1.57838 | Optical |
| 4 | ∞ | — | | — | | Disc |

The following Table 13 shows the conical coefficients κ and aspherical coefficients $A_4, A_6 \ldots$ of each aspherical surface.

TABLE 13

| | Surface No. | | |
|---|---|---|---|
| | 1-1 | 1-2 | 2 |
| κ | −8.50000E−01 | −8.50000E−01 | −4.14000E+01 |
| $4^{th}$ order | 4.51500E−02 | 4.63200E−02 | 2.34600E−01 |
| $6^{th}$ order | 2.10600E−02 | 1.56000E−02 | −2.77000E−01 |
| $8^{th}$ order | 2.02500E−02 | 1.13900E−03 | 7.11600E−02 |
| $10^{th}$ order | −3.00700E−02 | 2.48200E−03 | 4.70000E−02 |
| $12^{th}$ order | 3.18200E−02 | 1.75900E−02 | −1.08000E−02 |
| $14^{th}$ order | −1.11500E−02 | −1.37100E−03 | −2.15500E−02 |
| $16^{th}$ order | 0.00000E+00 | −4.44500E−03 | −6.45500E−03 |
| $18^{th}$ order | 0.00000E+00 | 5.44000E−03 | 1.55500E−02 |
| $20^{th}$ order | 0.00000E+00 | 3.96200E−03 | −5.17800E−03 |
| $22^{nd}$ order | 0.00000E+00 | −3.44190E−03 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 14 shows coefficients of the optical path difference functions respectively defining the annular zone structures in the regions RC and RE on the first surface 10a of the objective lens 10.

TABLE 14

| | Surface No. | |
|---|---|---|
| | 1-1 | 1-2 |
| Diffraction order | 1/1 | 1 |
| $2^{nd}$ order | 7.90700E+01 | 8.00000E+01 |
| $4^{th}$ order | −2.08000E+01 | −1.80000E+01 |
| $6^{th}$ order | 1.30000E+01 | −6.00000E+00 |
| $8^{th}$ order | −1.27500E+01 | −1.50000E+00 |
| $10^{th}$ order | 1.35500E+00 | 0.00000E+00 |
| $12^{th}$ order | 0.00000E+00 | 0.00000E+00 |

FOURTH EXAMPLE

Hereafter, a fourth example of the optical information recording/reproducing apparatus 100 is described. The specifications of the objective lens 10 mounted on the optical information recording/reproducing apparatus 100 according to the fourth example are indicated in the following Table 15.

TABLE 15

| Wavelength (nm) | 406 | 662 |
|---|---|---|
| Focal Length (mm) | 1.77 | 1.86 |
| NA | 0.85 | 0.60 |
| Magnification | 0.000 | 0.000 |

The following Table 16 shows a numeral configuration of the optical information recording/reproducing apparatus 100 defined when each of the optical discs D1 and D2 is used.

TABLE 16

| Surface No. | r | d(406 nm) | n(406 nm) | d(662 nm) | n(662 nm) | |
|---|---|---|---|---|---|---|
| 1-1 | 1.107 | 2.00 | 1.55903 | 2.00 | 1.53927 | Objective |
| 1-2 | 1.100 | | | | | Lens |
| 2 | −2.509 | 0.63 | | 0.40 | | |
| 3 | ∞ | 0.0875 | 1.62096 | 0.6000 | 1.57838 | Optical |
| 4 | ∞ | — | | — | | Disc |

The following Table 17 shows the conical coefficients κ and aspherical coefficients $A_4, A_6 \ldots$ of each aspherical surface.

TABLE 17

| | Surface No. | | |
|---|---|---|---|
| | 1-1 | 1-2 | 2 |
| κ | −8.50000E−01 | −8.50000E−01 | −4.60000E+01 |
| $4^{th}$ order | 2.57600E−02 | 2.35100E−02 | 1.43900E−01 |
| $6^{th}$ order | 6.22900E−03 | 1.99900E−03 | −1.25500E−01 |
| $8^{th}$ order | 1.89400E−03 | 6.18600E−03 | 3.81600E−02 |
| $10^{th}$ order | −3.34900E−04 | −6.97600E−03 | 1.57900E−03 |
| $12^{th}$ order | 7.39300E−04 | 5.08200E−03 | −4.33100E−03 |
| $14^{th}$ order | −2.10700E−04 | −7.39600E−04 | −5.37600E−04 |
| $16^{th}$ order | 0.00000E+00 | −7.12900E−04 | 8.77600E−04 |
| $18^{th}$ order | 0.00000E+00 | 1.27800E−04 | 2.10800E−04 |
| $20^{th}$ order | 0.00000E+00 | 1.55920E−04 | −3.70300E−04 |
| $22^{nd}$ order | 0.00000E+00 | −5.33230E−05 | 1.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 18 shows coefficients of the optical path difference functions respectively defining the annular zone structures in the regions RC and RE on the first surface 10a of the objective lens 10.

TABLE 18

| | Surface No. | |
|---|---|---|
| | 1-1 | 1-2 |
| Diffraction order | 1/1 | 1 |
| $2^{nd}$ order | 3.10400E+01 | 3.50000E+01 |
| $4^{th}$ order | −7.50000E−02 | −1.10000E+01 |
| $6^{th}$ order | −5.83000E−01 | −4.00000E+00 |
| $8^{th}$ order | −6.74000E−01 | −6.00000E−01 |
| $10^{th}$ order | −1.84000E−01 | 0.00000E+00 |
| $12^{th}$ order | 0.00000E+00 | 0.00000E+00 |

FIFTH EXAMPLE

Hereafter, a fifth example of the optical information recording/reproducing apparatus 100 is described. The specifications of the objective lens 10 mounted on the optical information recording/reproducing apparatus 100 according to the fifth example are indicated in the following Table 19.

TABLE 19

| Wavelength (nm) | 406 | 662 |
|---|---|---|
| Focal Length (mm) | 1.77 | 1.92 |
| NA | 0.85 | 0.60 |
| Magnification | 0.000 | 0.000 |

The following Table 20 shows a numeral configuration of the optical information recording/reproducing apparatus 100 defined when each of the optical discs D1 and D2 is used.

TABLE 20

| Surface No. | r | d(406 nm) | n(406 nm) | d(662 nm) | n(662 nm) | |
|---|---|---|---|---|---|---|
| 1-1 | 1.054 | 2.05 | 1.55903 | 2.05 | 1.53927 | Objective Lens |
| 1-2 | 1.046 | | | | | |
| 2 | −2.170 | 0.63 | | 0.50 | | |
| 3 | ∞ | 0.0875 | 1.62096 | 0.6000 | 1.57838 | Optical Disc |
| 4 | ∞ | — | | — | | |

The following Table 21 shows the conical coefficients κ and aspherical coefficients $A_4, A_6$ ... of each aspherical surface.

TABLE 21

| | Surface No. | | |
|---|---|---|---|
| | 1-1 | 1-2 | 2 |
| κ | −8.50000E−01 | −8.50000E−01 | −3.80000E+01 |
| $4^{th}$ order | 2.30900E−02 | 2.70200E−02 | 1.55100E−01 |
| $6^{th}$ order | 1.05200E−02 | 2.79000E−03 | −1.50400E−01 |
| $8^{th}$ order | 2.31500E−03 | 2.89800E−03 | 4.99000E−02 |
| $10^{th}$ order | −1.61000E−03 | −2.91000E−03 | 1.03100E−02 |
| $12^{th}$ order | 1.91400E−03 | 2.59100E−03 | −8.13800E−03 |
| $14^{th}$ order | −4.52800E−04 | −4.88400E−04 | −6.21400E−03 |
| $16^{th}$ order | 0.00000E+00 | −4.03300E−04 | 1.28800E−03 |
| $18^{th}$ order | 0.00000E+00 | 9.81700E−05 | 5.40400E−03 |
| $20^{th}$ order | 0.00000E+00 | 8.91400E−05 | −3.62100E−03 |
| $22^{nd}$ order | 0.00000E+00 | −3.64115E−05 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 22 shows coefficients of the optical path difference functions respectively defining the annular zone structures in the regions RC and RE on the first surface 10a of the objective lens 10.

TABLE 22

| | Surface No. | |
|---|---|---|
| | 1-1 | 1-2 |
| Diffraction order | 1/1 | 1 |
| $2^{nd}$ order | 8.00000E+01 | 8.50000E+01 |
| $4^{th}$ order | −1.03400E+01 | −5.00000E+00 |
| $6^{th}$ order | 6.57000E+00 | −5.00000E+00 |
| $8^{th}$ order | −3.12000E+00 | −1.30000E+00 |
| $10^{th}$ order | 6.86000E−01 | 0.00000E+00 |
| $12^{th}$ order | 0.00000E+00 | 0.00000E+00 |

SIXTH EXAMPLE

Hereafter, a sixth example of the optical information recording/reproducing apparatus 100 is described. The specifications of the objective lens 10 mounted on the optical information recording/reproducing apparatus 100 according to the sixth example are indicated in the following Table 23.

TABLE 23

| Wavelength (nm) | 406 | 662 |
|---|---|---|
| Focal Length (mm) | 1.18 | 1.27 |
| NA | 0.85 | 0.60 |
| Magnification | 0.000 | 0.000 |

The following Table 24 shows a numeral configuration of the optical information recording/reproducing apparatus 100 defined when each of the optical discs D1 and D2 is used.

TABLE 24

| Surface No. | r | d(406 nm) | n(406 nm) | d(662 nm) | n(662 nm) | |
|---|---|---|---|---|---|---|
| 1-1 | 0.714 | 1.35 | 1.55903 | 1.35 | 1.53927 | Objective Lens |
| 1-2 | 0.725 | | | | | |
| 2 | −1.469 | 0.41 | | 0.20 | | |
| 3 | ∞ | 0.0875 | 1.62096 | 0.6000 | 1.57838 | Optical Disc |
| 4 | ∞ | — | | — | | |

The following Table 25 shows the conical coefficients κ and aspherical coefficients $A_4, A_6$ ... of each aspherical surface.

TABLE 25

| | Surface No. | | |
|---|---|---|---|
| | 1-1 | 1-2 | 2 |
| κ | −8.50000E−01 | −8.50000E−01 | −3.47000E+01 |
| $4^{th}$ order | 7.13400E−02 | 9.69000E−02 | 4.68800E−01 |
| $6^{th}$ order | 6.34400E−02 | 6.50000E−02 | −9.07700E−01 |
| $8^{th}$ order | 9.72100E−04 | −1.65820E−01 | 6.31400E−01 |
| $10^{th}$ order | 4.93000E−02 | 5.26900E−01 | 1.32260E−01 |
| $12^{th}$ order | −2.02100E−02 | −5.20800E−01 | −5.96400E−01 |
| $14^{th}$ order | 0.00000E+00 | −1.16450E−01 | 5.46470E−01 |
| $16^{th}$ order | 0.00000E+00 | 6.67900E−01 | −3.75110E−01 |
| $18^{th}$ order | 0.00000E+00 | −3.87790E−01 | 1.40000E−01 |
| $20^{th}$ order | 0.00000E+00 | 0.00000E+00 | 0.00000E+00 |
| $22^{nd}$ order | 0.00000E+00 | 0.00000E+00 | 0.00000E+00 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 26 shows coefficients of the optical path difference functions respectively defining the annular zone structures in the regions RC and RE on the first surface 10a of the objective lens 10.

TABLE 26

| | Surface No. | |
|---|---|---|
| | 1-1 | 1-2 |
| Diffraction order | 1/1 | 1 |
| $2^{nd}$ order | 1.04640E+02 | 9.00000E+01 |
| $4^{th}$ order | −3.90500E+01 | 0.00000E+00 |
| $6^{th}$ order | 2.17500E+01 | −3.00000E+01 |
| $8^{th}$ order | −3.23500E+01 | 0.00000E+00 |
| $10^{th}$ order | 0.00000E+00 | 0.00000E+00 |
| $12^{th}$ order | 0.00000E+00 | 0.00000E+00 |

SEVENTH EXAMPLE

Hereafter, a seventh example of the optical information recording/reproducing apparatus 100 is described. The specifications of the objective lens 10 mounted on the optical information recording/reproducing apparatus 100 according to the seventh example are indicated in the following Table 27.

TABLE 27

| Wavelength (nm) | 406 | 662 |
|---|---|---|
| Focal Length (mm) | 1.41 | 1.50 |
| NA | 0.85 | 0.60 |
| Magnification | 0.000 | 0.000 |

The following Table 28 shows a numeral configuration of the optical information recording/reproducing apparatus 100 defined when each of the optical discs D1 and D2 is used.

TABLE 28

| Surface No. | r | d(406 nm) | n(406 nm) | d(662 nm) | n(662 nm) | |
|---|---|---|---|---|---|---|
| 1-1 | 0.880 | 1.60 | 1.55903 | 1.60 | 1.53927 | Objective Lens |
| 1-2 | 0.886 | | | | | |
| 2 | −1.876 | 0.50 | | 0.28 | | |
| 3 | ∞ | 0.0875 | 1.62096 | 0.6000 | 1.57838 | Optical Disc |
| 4 | ∞ | — | | — | | |

The following Table 29 shows the conical coefficients κ and aspherical coefficients $A_4$, $A_6$ . . . of each aspherical surface.

TABLE 29

| | Surface No. | | |
|---|---|---|---|
| | 1-1 | 1-2 | 2 |
| κ | −8.50000E−01 | −8.50000E−01 | −3.80000E+01 |
| $4^{th}$ order | 4.57300E−02 | 4.98400E−02 | 2.42800E−01 |
| $6^{th}$ order | 1.25500E−02 | 2.06900E−02 | −2.80900E−01 |
| $8^{th}$ order | 2.19400E−02 | −2.15900E−03 | 7.62500E−02 |
| $10^{th}$ order | −2.60400E−02 | 1.10700E−02 | 4.52400E−02 |
| $12^{th}$ order | 2.76800E−02 | 1.14700E−02 | −1.17600E−02 |
| $14^{th}$ order | −1.07400E−02 | −1.32600E−02 | −2.05200E−02 |
| $16^{th}$ order | 0.00000E+00 | −2.50000E−03 | −5.48200E−03 |
| $18^{th}$ order | 0.00000E+00 | 5.37700E−03 | 1.51500E−02 |
| $20^{th}$ order | 0.00000E+00 | 3.29500E−03 | −5.59100E−03 |
| $22^{nd}$ order | 0.00000E+00 | −3.28800E−03 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 30 shows coefficients of the optical path difference functions respectively defining the annular zone structures in the regions RC and RE on the first surface 10a of the objective lens 10. As shown in Table 30, the diffraction order at which the diffraction efficiency is maximized for the laser beam L1 in the second region RE is the $2^{nd}$ order. Therefore, the diffraction orders of the undesired diffraction order light caused in the second region RE when the optical disc D1 is used are the $1^{st}$ order and the $3^{rd}$ order.

TABLE 30

| | Surface No. | |
|---|---|---|
| Diffraction order | 1-1 1/1 | 1-2 2 |
| $2^{nd}$ order | 5.53000E+01 | 2.50000E+01 |
| $4^{th}$ order | −1.70700E+01 | −5.00000E+00 |
| $6^{th}$ order | −2.90700E+00 | −1.50000E+00 |
| $8^{th}$ order | −8.20000E−01 | −3.50000E−01 |

TABLE 30-continued

| | Surface No. | |
|---|---|---|
| Diffraction order | 1-1 1/1 | 1-2 2 |
| $10^{th}$ order | −3.15300E+00 | 0.00000E+00 |
| $12^{th}$ order | 0.00000E+00 | 0.00000E+00 |

EIGHTH EXAMPLE

Hereafter, an eighth example of the optical information recording/reproducing apparatus 100 is described. The specifications of the objective lens 10 mounted on the optical information recording/reproducing apparatus 100 according to the eighth example are indicated in the following Table 31.

TABLE 31

| Wavelength (nm) | 406 | 662 |
|---|---|---|
| Focal Length (mm) | 1.41 | 1.49 |
| NA | 0.85 | 0.65 |
| Magnification | 0.000 | 0.000 |

The following Table 32 shows a numeral configuration of the optical information recording/reproducing apparatus 100 defined when each of the optical discs D1 and D2 is used.

TABLE 32

| Surface No. | r | d(406 nm) | n(406 nm) | d(662 nm) | n(662 nm) | |
|---|---|---|---|---|---|---|
| 1-1 | 0.896 | 1.60 | 1.55903 | 1.60 | 1.53927 | Objective Lens |
| 1-2 | 0.902 | | | | | |
| 2 | −1.933 | 0.50 | | 0.25 | | |
| 3 | ∞ | 0.0875 | 1.62096 | 0.6000 | 1.57838 | Optical Disc |
| 4 | ∞ | — | | — | | |

The following Table 33 shows the conical coefficients κ and aspherical coefficients $A_4$, $A_6$ . . . of each aspherical surface.

TABLE 33

| | Surface No. | | |
|---|---|---|---|
| | 1-1 | 1-2 | 2 |
| κ | −8.50000E−01 | −8.50000E−01 | −4.10000E+01 |
| $4^{th}$ order | 4.55200E−02 | 5.04200E−02 | 2.36600E−01 |
| $6^{th}$ order | 1.02000E−02 | 1.95700E−02 | −2.75700E−01 |
| $8^{th}$ order | 1.96000E−02 | 7.27300E−04 | 7.17700E−02 |
| $10^{th}$ order | −2.39100E−02 | 4.54600E−03 | 4.68300E−02 |
| $12^{th}$ order | 2.50100E−02 | 1.64600E−02 | −1.09400E−02 |
| $14^{th}$ order | −1.01400E−02 | −1.35400E−02 | −2.14000E−02 |
| $16^{th}$ order | 0.00000E+00 | −4.05600E−03 | −6.09800E−03 |
| $18^{th}$ order | 0.00000E+00 | 5.38000E−03 | 1.55900E−02 |
| $20^{th}$ order | 0.00000E+00 | 3.82700E−03 | −5.48100E−03 |
| $22^{nd}$ order | 0.00000E+00 | −3.38300E−03 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 34 shows coefficients of the optical path difference functions respectively defining the annular zone structures in the regions RC and RE on the first surface 10a of the objective lens 10. As shown in Table 34, the diffraction order at which the diffraction efficiency is maximized for the laser beam L1 in the second region RE is the $4^{th}$ order. Therefore, the diffraction orders of the undesired diffraction order light caused in the second region RE when the optical disc D1 is used are the $3^{rd}$ order and the $5^{th}$ order.

TABLE 34

| Diffraction order | Surface No. 1-1 1/1 | 1-2 4 |
|---|---|---|
| $2^{nd}$ order | 3.51200E+01 | 7.50000E+00 |
| $4^{th}$ order | −1.80000E+01 | −2.50000E+00 |
| $6^{th}$ order | −6.28000E+00 | −7.50000E−01 |
| $8^{th}$ order | −1.00000E−01 | −1.75000E−01 |
| $10^{th}$ order | −3.84400E+00 | 0.00000E+00 |
| $12^{th}$ order | 0.00000E+00 | 0.00000E+00 |

NINTH EXAMPLE

Hereafter, a ninth example of the optical information recording/reproducing apparatus 100 is described. The specifications of the objective lens 10 mounted on the optical information recording/reproducing apparatus 100 according to the ninth example are indicated in the following Table 35.

TABLE 35

| Wavelength (nm) | 406 | 662 |
|---|---|---|
| Focal Length (mm) | 1.18 | 1.27 |
| NA | 0.85 | 0.65 |
| Magnification | 0.000 | 0.000 |

The following Table 36 shows a numeral configuration of the optical information recording/reproducing apparatus 100 defined when each of the optical discs D1 and D2 is used.

TABLE 36

| Surface No. | r | d(406 nm) | n(406 nm) | d(662 nm) | n(662 nm) | |
|---|---|---|---|---|---|---|
| 1-1 | 0.714 | 1.35 | 1.55903 | 1.35 | 1.53927 | Objective |
| 1-2 | 0.725 | | | | | Lens |
| 2 | −1.469 | 0.41 | | 0.20 | | |
| 3 | ∞ | 0.0875 | 1.62096 | 0.6000 | 1.57838 | Optical |
| 4 | ∞ | — | | — | | Disc |

The following Table 37 shows the conical coefficients κ and aspherical coefficients $A_4$, $A_6$ ... of each aspherical surface.

TABLE 37

| | Surface No. | | |
|---|---|---|---|
| | 1-1 | 1-2 | 2 |
| κ | −8.50000E−01 | −8.50000E−01 | −3.47000E+01 |
| $4^{th}$ order | 6.95700E−02 | 9.69000E−02 | 4.68800E−01 |
| $6^{th}$ order | 7.78500E−02 | 6.50000E−02 | −9.07700E−01 |
| $8^{th}$ order | −4.51100E−02 | −1.65820E−01 | 6.31400E−01 |
| $10^{th}$ order | 1.19600E−01 | 5.26900E−01 | 1.32260E−01 |
| $12^{th}$ order | −6.25200E−02 | −5.20800E−01 | −5.96400E−01 |
| $14^{th}$ order | 0.00000E+00 | −1.16450E−01 | 5.46470E−01 |
| $16^{th}$ order | 0.00000E+00 | 6.67900E−01 | −3.75110E−01 |
| $18^{th}$ order | 0.00000E+00 | −3.87790E−01 | 1.40000E−01 |
| $20^{th}$ order | 0.00000E+00 | 0.00000E+00 | 0.00000E+00 |
| $22^{nd}$ order | 0.00000E+00 | 0.00000E+00 | 0.00000E+00 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 38 shows coefficients of the optical path difference functions respectively defining the annular zone structures in the regions RC and RE on the first surface 10a of the objective lens 10.

TABLE 38

| Diffraction order | Surface No. 1-1 1/1 | 1-2 1 |
|---|---|---|
| $2^{nd}$ order | 1.04640E+02 | 9.00000E+01 |
| $4^{th}$ order | −3.99700E+01 | 0.00000E+00 |
| $6^{th}$ order | 2.60100E+01 | −3.00000E+01 |
| $8^{th}$ order | −3.69500E+01 | 0.00000E+00 |
| $10^{th}$ order | 0.00000E+00 | 0.00000E+00 |
| $12^{th}$ order | 0.00000E+00 | 0.00000E+00 |

TENTH EXAMPLE

Hereafter, a tenth example of the optical information recording/reproducing apparatus 100 is described. The specifications of the objective lens 10 mounted on the optical information recording/reproducing apparatus 100 according to the tenth example are indicated in the following Table 39.

TABLE 39

| Wavelength (nm) | 406 | 662 |
|---|---|---|
| Focal Length (mm) | 1.18 | 1.27 |
| NA | 0.85 | 0.60 |
| Magnification | 0.000 | 0.000 |

The following Table 40 shows a numeral configuration of the optical information recording/reproducing apparatus 100 defined when each of the optical discs D1 and D2 is used.

TABLE 40

| Surface No. | r | d(406 nm) | n(406 nm) | d(662 nm) | n(662 nm) | |
|---|---|---|---|---|---|---|
| 1-1 | 0.714 | 1.35 | 1.55903 | 1.35 | 1.53927 | Objective |
| 1-2 | 0.725 | | | | | Lens |
| 2 | −1.469 | 0.41 | | 0.20 | | |
| 3 | ∞ | 0.0875 | 1.62096 | 0.6000 | 1.57838 | Optical |
| 4 | ∞ | — | | — | | Disc |

The following Table 41 shows the conical coefficients κ and aspherical coefficients $A_4$, $A_6$ ... of each aspherical surface.

TABLE 41

| | Surface No. | | |
|---|---|---|---|
| | 1-1 | 1-2 | 2 |
| κ | −8.50000E−01 | −8.50000E−01 | −3.47000E+01 |
| $4^{th}$ order | 7.13400E−02 | 9.69000E−02 | 4.68800E−01 |
| $6^{th}$ order | 6.34400E−02 | 6.50000E−02 | −9.07700E−01 |
| $8^{th}$ order | 9.72100E−04 | −1.65820E−01 | 6.31400E−01 |
| $10^{th}$ order | 4.93000E−02 | 5.26900E−01 | 1.32260E−01 |
| $12^{th}$ order | −2.02100E−02 | −5.20800E−01 | −5.96400E−01 |
| $14^{th}$ order | 0.00000E+00 | −1.16450E−01 | 5.46470E−01 |
| $16^{th}$ order | 0.00000E+00 | 6.67900E−01 | −3.75110E−01 |
| $18^{th}$ order | 0.00000E+00 | −3.87790E−01 | 1.40000E−01 |
| $20^{th}$ order | 0.00000E+00 | 0.00000E+00 | 0.00000E+00 |
| $22^{nd}$ order | 0.00000E+00 | 0.00000E+00 | 0.00000E+00 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 42 shows coefficients of the optical path difference functions respectively defining the annular zone structures in the regions RC and RE on the first surface 10a of the objective lens 10. As shown in Table 42, the diffraction order at which the diffraction efficiency is maximized for the laser beam L1 in the second region RE is the $2^{nd}$ order. Therefore, the diffraction orders of the undesired diffraction order light caused in the second region RE when the optical disc D1 is used are the $1^{st}$ order and the $3^{rd}$ order.

TABLE 42

| | Surface No. | |
|---|---|---|
| Diffraction order | 1-1 / 1 | 1-2 / 2 |
| $2^{nd}$ order | 1.04640E+02 | 4.50000E+01 |
| $4^{th}$ order | −3.90500E+01 | 0.00000E+00 |
| $6^{th}$ order | 2.17500E+01 | −1.50000E+01 |
| $8^{th}$ order | −3.23500E+01 | 0.00000E+00 |
| $10^{th}$ order | 0.00000E+00 | 0.00000E+00 |
| $12^{th}$ order | 0.00000E+00 | 0.00000E+00 |

ELEVENTH EXAMPLE

Hereafter, an eleventh example of the optical information recording/reproducing apparatus 100 is described. The specifications of the objective lens 10 mounted on the optical information recording/reproducing apparatus 100 according to the eleventh example are indicated in the following Table 43. An optical system of the optical information recording/reproducing apparatus 100 according to the eleventh example is a finite optical system, and as shown in Table 43 a diverging light beam having a low degree of divergence is incident on the objective lens 10 when the optical disc D2 is used.

TABLE 43

| Wavelength (nm) | 406 | 662 |
|---|---|---|
| Focal Length (mm) | 1.18 | 1.27 |
| NA | 0.85 | 0.60 |
| Magnification | 0.000 | −0.0085 |

The following Table 44 shows a numeral configuration of the optical information recording/reproducing apparatus 100 defined when each of the optical discs D1 and D2 is used.

TABLE 44

| Surface No. | r | d(406 nm) | n(406 nm) | d(662 nm) | n(662 nm) | |
|---|---|---|---|---|---|---|
| 1-1 | 0.714 | 1.35 | 1.55903 | 1.35 | 1.53927 | Objective Lens |
| 1-2 | 0.725 | | | | | |
| 2 | −1.469 | 0.41 | | 0.22 | | |
| 3 | ∞ | 0.0875 | 1.62096 | 0.6000 | 1.57838 | Optical Disc |
| 4 | ∞ | — | | — | | |

The following Table 45 shows the conical coefficients κ and aspherical coefficients $A_4$, $A_6$ ... of each aspherical surface.

TABLE 45

| | Surface No. | | |
|---|---|---|---|
| | 1-1 | 1-2 | 2 |
| κ | −8.50000E−01 | −8.50000E−01 | −3.47000E+01 |
| $4^{th}$ order | 7.13200E−02 | 9.69000E−02 | 4.68800E−01 |
| $6^{th}$ order | 6.54600E−02 | 6.50000E−02 | −9.07700E−01 |
| $8^{th}$ order | 6.49200E−03 | −1.65820E−01 | 6.31400E−01 |
| $10^{th}$ order | 4.53100E−02 | 5.26900E−01 | 1.32260E−01 |

TABLE 45-continued

| | Surface No. | | |
|---|---|---|---|
| | 1-1 | 1-2 | 2 |
| $12^{th}$ order | −1.63100E−02 | −5.20800E−01 | −5.96400E−01 |
| $14^{th}$ order | 0.00000E+00 | −1.16450E−01 | 5.46470E−01 |
| $16^{th}$ order | 0.00000E+00 | 6.67900E−01 | −3.75110E−01 |
| $18^{th}$ order | 0.00000E+00 | −3.87790E−01 | 1.40000E−01 |
| $20^{th}$ order | 0.00000E+00 | 0.00000E+00 | 0.00000E+00 |
| $22^{nd}$ order | 0.00000E+00 | 0.00000E+00 | 0.00000E+00 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 46 shows coefficients of the optical path difference functions respectively defining the annular zone structures in the regions RC and RE on the first surface 10a of the objective lens 10. As shown in Table 46, the diffraction order at which the diffraction efficiency is maximized for the laser beam L1 in the second region RE is the $2^{nd}$ order. Therefore, the diffraction orders of the undesired diffraction order light caused in the second region RE when the optical disc D1 is used are the $1^{st}$ order and the $3^{rd}$ order.

TABLE 46

| | Surface No. | |
|---|---|---|
| Diffraction order | 1-1 / 1 | 1-2 / 2 |
| $2^{nd}$ order | 1.04640E+02 | 4.50000E+01 |
| $4^{th}$ order | −3.92500E+01 | 0.00000E+00 |
| $6^{th}$ order | 2.60900E+01 | −1.50000E+01 |
| $8^{th}$ order | −3.06000E+01 | 0.00000E+00 |
| $10^{th}$ order | 0.00000E+00 | 0.00000E+00 |
| $12^{th}$ order | 0.00000E+00 | 0.00000E+00 |

TWELFTH EXAMPLE

Hereafter, a twelfth example of the optical information recording/reproducing apparatus 100 is described. The specifications of the objective lens 10 mounted on the optical information recording/reproducing apparatus 100 according to the twelfth example are indicated in the following Table 47. An optical system of the optical information recording/reproducing apparatus 100 according to the twelfth example is a finite optical system, and as shown in Table 47 a diverging light beam having a low degree of divergence is incident on the objective lens 10 when the optical disc D2 is used.

TABLE 47

| Wavelength (nm) | 406 | 662 |
|---|---|---|
| Focal Length (mm) | 1.41 | 1.50 |
| NA | 0.85 | 0.60 |
| Magnification | 0.000 | −0.015 |

The following Table 48 shows a numeral configuration of the optical information recording/reproducing apparatus 100 defined when each of the optical discs D1 and D2 is used.

TABLE 48

| Surface No. | r | d(406 nm) | n(406 nm) | d(662 nm) | n(662 nm) | |
|---|---|---|---|---|---|---|
| 1-1 | 0.838 | 1.35 | 1.52350 | 1.35 | 1.50519 | Objective Lens |
| 1-2 | 0.826 | | | | | |
| 2 | −1.408 | 0.49 | | 0.30 | | |
| 3 | ∞ | 0.0875 | 1.62096 | 0.6000 | 1.57838 | Optical Disc |
| 4 | ∞ | — | | — | | |

The following Table 49 shows the conical coefficients κ and aspherical coefficients $A_4$, $A_6$ . . . of each aspherical surface.

TABLE 49

| | Surface No. | | |
|---|---|---|---|
| | 1-1 | 1-2 | 2 |
| κ | −8.50000E−01 | −8.50000E−01 | −2.58000E+01 |
| $4^{th}$ order | 4.56500E−02 | 4.24500E−02 | 2.48400E−01 |
| $6^{th}$ order | 2.02600E−02 | 9.18700E−03 | −2.62100E−01 |
| $8^{th}$ order | 2.42200E−02 | 3.89900E−02 | 3.71700E−02 |
| $10^{th}$ order | −2.86700E−02 | −7.03300E−02 | 7.19900E−02 |
| $12^{th}$ order | 3.12600E−02 | 8.60600E−02 | 5.08500E−03 |
| $14^{th}$ order | −1.00800E−02 | −2.29300E−02 | −3.73000E−02 |
| $16^{th}$ order | 0.00000E+00 | −2.73500E−02 | −8.22000E−03 |
| $18^{th}$ order | 0.00000E+00 | 9.05900E−03 | 3.05000E−02 |
| $20^{th}$ order | 0.00000E+00 | 1.54500E−02 | −1.49400E−02 |
| $22^{nd}$ order | 0.00000E+00 | −8.37660E−03 | 0.00000E+00 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 50 shows coefficients of the optical path difference functions respectively defining the annular zone structures in the regions RC and RE on the first surface 10a of the objective lens 10.

TABLE 50

| | Surface No. | |
|---|---|---|
| | 1-1 | 1-2 |
| Diffraction order | 1/1 | 1 |
| $2^{nd}$ order | 7.09000E+01 | 8.20800E+01 |
| $4^{th}$ order | −2.05000E+01 | −2.47000E+01 |
| $6^{th}$ order | 9.49000E+00 | −4.50000E+00 |
| $8^{th}$ order | −7.76500E+00 | −8.00000E−01 |
| $10^{th}$ order | 0.00000E+00 | 0.00000E+00 |
| $12^{th}$ order | 0.00000E+00 | 0.00000E+00 |

COMPARATIVE EXAMPLE

Hereafter, a comparative example is explained. An optical information recording/reproducing apparatus according to the comparative example has a general configuration substantially equal to that shown in FIG. 1. Although the shape of the objective lens according to the comparative example is different from the shape of the objective lens according each of the first to twelfth examples, the difference in shape of the objective lens between the comparative example and each of the first to twelfth examples is extremely small and cannot be expressed in the scale size of the accompanying drawings. Therefore, the configuration of the objective lens according to the comparative example is explained with reference to FIGS. 2A and 2B.

The specifications of the objective lens 10 mounted on the optical information recording/reproducing apparatus according to the comparative example are indicated in the following Table 51.

TABLE 51

| | Wavelength (nm) | 406 | 662 |
|---|---|---|---|
| | Focal Length (mm) | 1.41 | 1.47 |
| | NA | 0.85 | 0.60 |
| | Magnification | 0.000 | 0.000 |

The following Table 52 shows a numeral configuration of the optical information recording/reproducing apparatus according to the comparative example defined when each of the optical discs D1 and D2 is used.

TABLE 52

| Surface No. | r | d(406 nm) | n(406 nm) | d(662 nm) | n(662 nm) | |
|---|---|---|---|---|---|---|
| 1-1 | 0.917 | 1.70 | 1.55903 | 1.70 | 1.53927 | Objective Lens |
| 1-2 | 0.917 | | | | | |
| 2 | −1.722 | 0.44 | | 0.18 | | |
| 3 | ∞ | 0.0875 | 1.62096 | 0.6000 | 1.57838 | Optical Disc |
| 4 | ∞ | — | | — | | |

The following Table 53 shows the conical coefficients κ and aspherical coefficients $A_4$, $A_6$ . . . of each aspherical surface in the comparative example.

TABLE 53

| | Surface No. | | |
|---|---|---|---|
| | 1-1 | 1-2 | 2 |
| κ | −8.50000E−01 | −8.50000E−01 | −4.40000E+01 |
| $4^{th}$ order | 4.32800E−02 | 4.62300E−02 | 2.47400E−01 |
| $6^{th}$ order | 1.27200E−02 | 1.93600E−02 | −3.15400E−01 |
| $8^{th}$ order | 1.03100E−02 | −1.04200E−02 | 7.39300E−02 |
| $10^{th}$ order | −1.97700E−02 | 1.63700E−02 | 5.82800E−02 |
| $12^{th}$ order | 2.13300E−02 | 9.53600E−03 | −6.50500E−03 |
| $14^{th}$ order | −8.32000E−03 | −1.46100E−02 | −2.41500E−02 |
| $16^{th}$ order | 0.00000E+00 | −2.51600E−03 | −1.11300E−02 |
| $18^{th}$ order | 0.00000E+00 | 5.49000E−03 | 1.41000E−02 |
| $20^{th}$ order | 0.00000E+00 | 3.45000E−03 | −1.93700E−03 |
| $22^{nd}$ order | 0.00000E+00 | −3.15970E−03 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

The following Table 54 shows coefficients of the optical path difference functions respectively defining the annular zone structures in the regions RC and RE on the first surface 10a of the objective lens 10 according to the comparative example.

TABLE 54

| | Surface No. | |
|---|---|---|
| | 1-1 | 1-2 |
| Diffraction order | 1/1 | 1 |
| $2^{nd}$ order | 2.00000E+01 | 2.00000E+01 |
| $4^{th}$ order | −2.12000E+01 | −1.60000E+01 |
| $6^{th}$ order | −9.24000E−01 | −4.00000E+00 |
| $8^{th}$ order | −9.42000E+00 | −1.20000E+00 |
| $10^{th}$ order | 0.00000E+00 | 0.00000E+00 |
| $12^{th}$ order | 0.00000E+00 | 0.00000E+00 |

Hereafter, a comparison is made between the first to twelfth examples and the comparative example. The following Table 55 shows, for each of in the first to twelfth examples and the comparative example, the values of the conditions (1) to (7), flare light distance Δf2 and the working distance defined when the optical disc D2 is used.

TABLE 55

|  | $1^{ST}$ EXAMPLE | $2^{ND}$ EXAMPLE | $3^{RD}$ EXAMPLE | $4^{TH}$ EXAMPLE | $5^{TH}$ EXAMPLE |
|---|---|---|---|---|---|
| CONDITION(1) | 83 | 52 | 120 | 58 | 154 |
| CONDITION(2) | 470 | 490 | 460 | 480 | 500 |
| CONDITION(3) | −0.003 | −0.005 | −0.003 | −0.005 | −0.002 |
| CONDITION(4) | 406 | 406 | 406 | 406 | 406 |
| CONDITION(5) | 0.66 | 0.63 | 0.66 | 0.76 | 0.82 |
| CONDITION(6) | 83 | 52 | 120 | 58 | 154 |
| CONDITION(7) | 1.41 | 1.41 | 1.41 | 1.77 | 1.77 |
| Δf2 | 0.11 | 0.07 | 0.15 | 0.10 | 0.23 |
| WORKING DISTANCE (DVD) | 0.28 | 0.25 | 0.29 | 0.40 | 0.50 |

|  | $6^{TH}$ EXAMPLE | $7^{TH}$ EXAMPLE | $8^{TH}$ EXAMPLE | $9^{TH}$ EXAMPLE | $10^{TH}$ EXAMPLE |
|---|---|---|---|---|---|
| CONDITION(1) | 133 | 83 | 52 | 133 | 133 |
| CONDITION(2) | 470 | 480 | 500 | 480 | 490 |
| CONDITION(3) | −0.002 | −0.003 | −0.005 | −0.002 | −0.002 |
| CONDITION(4) | 406 | 406 | 406 | 406 | 406 |
| CONDITION(5) | 0.61 | 0.66 | 0.63 | 0.61 | 0.61 |
| CONDITION(6) | 133 | 83 | 52 | 133 | 133 |
| CONDITION(7) | 1.18 | 1.41 | 1.41 | 1.18 | 1.18 |
| Δf2 | 0.14 | 0.11 | 0.07 | 0.14 | 0.14 |
| WORKING DISTANCE (DVD) | 0.20 | 0.28 | 0.25 | 0.20 | 0.20 |

|  | $11^{TH}$ EXAMPLE | $12^{TH}$ EXAMPLE | COMPARATIVE EXAMPLE |
|---|---|---|---|
| CONDITION(1) | 133 | 106 | 29 |
| CONDITION(2) | 450 | 450 | 450 |
| CONDITION(3) | −0.002 | −0.003 | −0.011 |
| CONDITION(4) | 406 | 406 | 406 |
| CONDITION(5) | 0.61 | 0.64 | 0.55 |
| CONDITION(6) | 133 | 106 | 29 |
| CONDITION(7) | 1.18 | 1.41 | 1.41 |
| Δf2 | 0.14 | 0.12 | 0.04 |
| WORKING DISTANCE (DVD) | 0.22 | 0.30 | 0.18 |

As shown in Table 55, the comparative example does not satisfy the condition (1) (or condition (3)). Specifically, in the comparative example, the intermediate term of the condition (1) is smaller than the lower limit of the condition (1), and therefore it is impossible to bring the paraxial focal point of the principal undesired diffraction order light to a point which is sufficiently away from the normal focal point. In this case, a large degree of bad effect is caused due to deterioration of signals caused by the principal undesired diffraction order light. By contrast, each of the first to twelfth examples satisfies the condition (1) (or condition (3)). Therefore, in the first to twelfth examples, it is possible to bring the paraxial focal point of the principal undesired diffraction order light to a point which is sufficiently away from the normal focal point, while suppressing increase of the number of steps in the diffraction structure and increase of the chromatic aberration. In this case, the effect of deterioration of signals caused by the principal undesired diffraction order light can be suppressed considerably.

As shown in Table 55, the comparative example does not satisfy the condition (5). Therefore, the comparative example is not able to secure an adequate working distance when the optical disc D2 is used. In this case, there are concerns that a fracture is caused by mechanically interfering between the objective lens 10 and the optical disc D2. By contrast, as shown in Table 55, each of the first to twelfth examples satisfies the condition (5). Therefore, according to each of the first to twelfth examples, it is possible to secure an adequate working distance when the optical disc D2 is used. In the case, the above described concerns do not arise.

In each of the first to twelfth examples, some conditions other than the conditions (1), (3) and (5) are additionally satisfied. Therefore, the first to twelfth examples are able to provide additional advantages which are achieved by satisfying the conditions other than the conditions (1), (3) and (5).

Figure 6B:
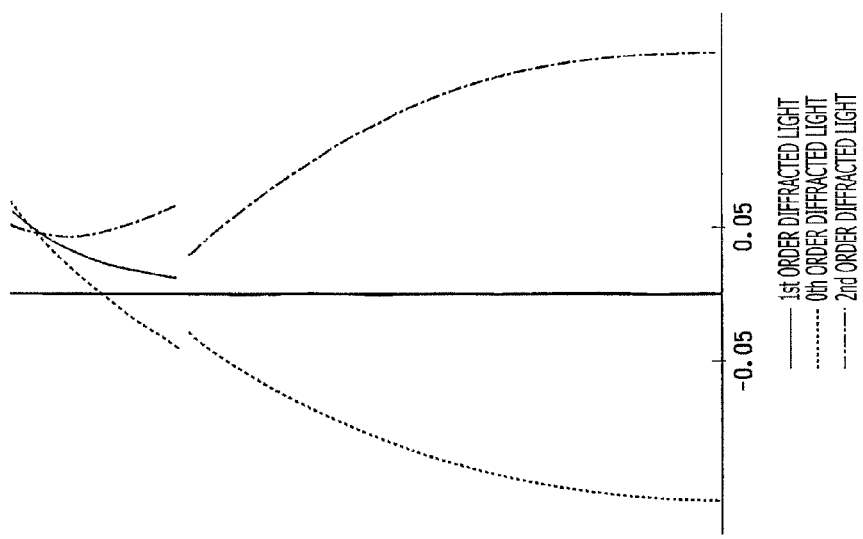
FIGS. 6A and 6B show the spherical aberrations of the use diffraction order light and the undesired diffraction order light when the optical discs D1 and D2 are used, respectively, in the first example.
Figure 6A:
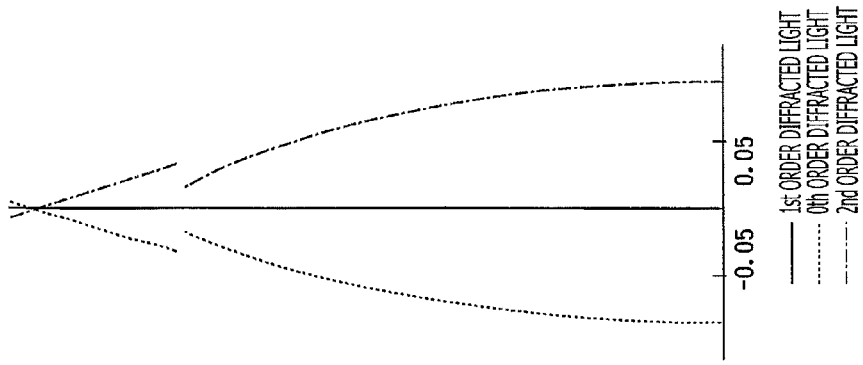

FIG. 5A is a graph illustrating the spherical aberration of the use diffraction order light (the first order diffracted light) caused when the optical disc D1 is used in the first example, and FIG. 5B is a graph illustrating the spherical aberration of the use diffraction order light (the first order diffracted light) caused when the optical disc D2 is used in the first example. FIG. 6A is a graph illustrating the spherical aberration of the use diffraction order light (the first order diffracted light) and the undesired order diffracted light (the $0^{th}$ order diffracted light and $2^{nd}$ order diffracted light) caused when the optical disc D1 is used in the first example, and FIG. 6B is a graph illustrating the spherical aberration of the use diffraction order light (the first order diffracted light) and the undesired order diffracted light (the $0^{th}$ order diffracted light and $2^{nd}$ order diffracted light) caused when the optical disc D2 is used in the first example. In each of FIGS. 5A and 5B, a curve indicated by a solid line represents the spherical aberration at the design wavelength, a curve indicated by a dotted line represents the spherical aberration at the wavelength shifted by +5 nm from the design wavelength, and a curve indicated by a chain line represents the spherical aberration at the wavelength shifted by −5 nm from the design wavelength. In each of FIGS. 6A and 6B, a curve indicated by a solid line represents the spherical aberration of the $1^{st}$ order diffracted light, a curve indicated by a dashed line represents the spherical aberration of the $0^{th}$ order diffracted light, and a curve indicated by a chain line represent the spherical aberration of the $2^{nd}$ order diffracted light. In each of FIGS. 5A, 5B, 6A and 6B, the vertical axis represents the pupil coordinate, and the horizontal axis represents the spherical aberration (unit: λrms). It should be noted that the different scale sizes are used for the horizontal axes of FIGS. 5A-5B and 6A-6B for the sake of convenience. Various definitions of FIGS. 5A-5B ad 6A-6B are also applied to the following similar drawings.

As shown in FIG. 5A, when the optical disc D1 is used, the spherical aberration of the use order diffracted light is corrected in each of the first region RC and the second region RE. As shown in FIG. 6A, the spherical aberration of the undesired diffraction order light is intentionally caused in each of the first region RC and the second region RE. That is, when the optical disc D1 is used, the paraxial focal point of the undesired diffraction order light is intentionally brought to a point which is away from the recording surface of the optical disc D1 (i.e., the normal focal point). With this configuration, it becomes possible to effectively suppress deterioration of signals caused by the undesired diffraction order light when the optical disc D1 is used.

As shown in FIG. 5B, when the optical disc D2 is used, the spherical aberration of the use order diffracted light is corrected in the first region RC, and the spherical aberration is intentionally caused in the second region RE with respect to diffracted light having the diffraction order of the use order diffraction light (i.e., undesired light). As shown in FIG. 6B, the spherical aberration of the undesired diffraction order light is intentionally caused in each of the first region RC and the second region RE. That is, when the optical disc D2 is used, the paraxial focal point of each of the undesired diffracted order light and the undesired light is intentionally brought to a point which is away from the recording surface of the optical disc D2 (i.e., the normal focal point). With this configuration, it becomes possible to effectively suppress deterioration of signals caused by the undesired diffraction order light or the undesired light when the optical disc D2 is used.

Figure 8A:
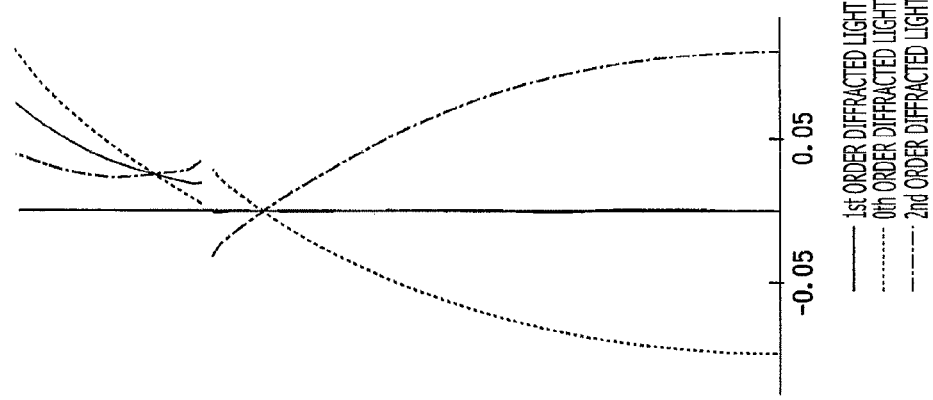
FIGS. 8A and 8B show the spherical aberrations of the use diffraction order light and the undesired diffraction order light when the optical discs D1 and D2 are used, respectively, in the second example.
Figure 8B:
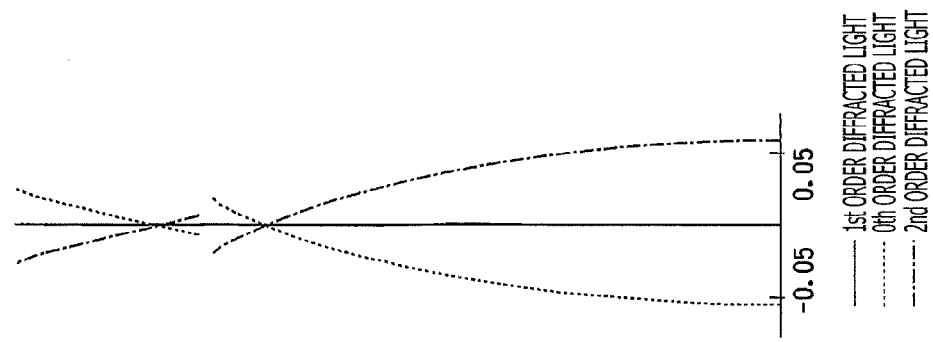

FIGS. 7A and 7B show the spherical aberrations of the use order diffraction light caused in the second example when the optical discs D1 and D2 are used, respectively. That is, FIGS. 7A and 7B correspond to FIGS. 5A and 5B, respectively. FIGS. 8A and 8B show the spherical aberrations of the use diffraction order light and the undesired diffraction order light caused in the second example when the optical discs D1 and D2 are used, respectively. That is, FIGS. 8A and 8B correspond to FIGS. 6A and 6B, respectively.

Figure 9B:
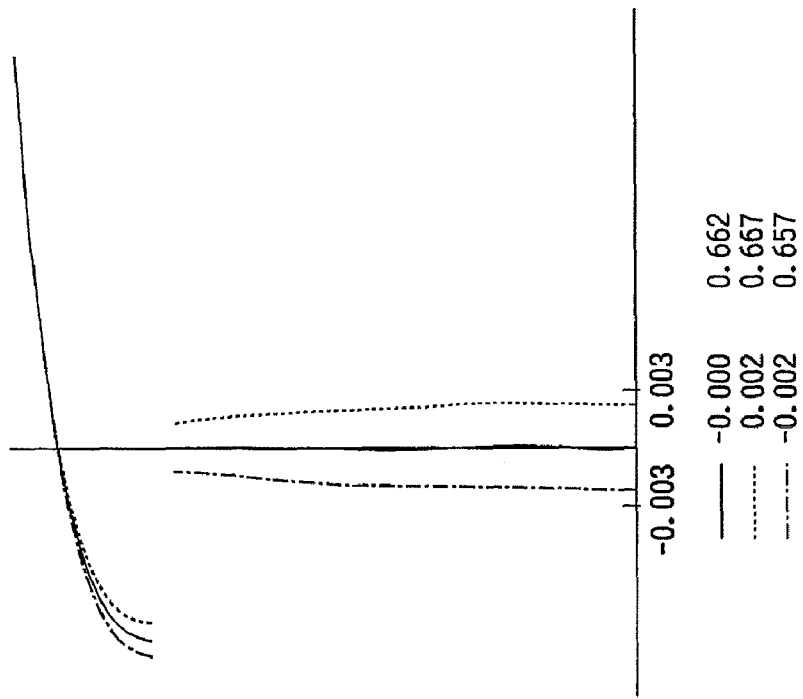
FIGS. 9A and 9B show the spherical aberration of the use diffraction order light when optical discs D1 and D2 are used, respectively, in a third example.
Figure 9A:
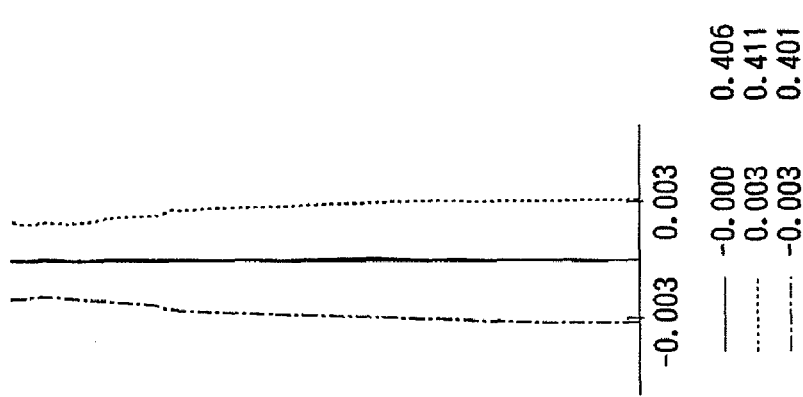

FIGS. 9A and 9B show the spherical aberrations of the use order diffraction light caused in the third example when the optical discs D1 and D2 are used, respectively. That is, FIGS. 9A and 9B correspond to FIGS. 5A and 5B, respectively. FIGS. 10A and 10B show the spherical aberrations of the use diffraction order light and the undesired diffraction order light caused in the third example when the optical discs D1 and D2 are used, respectively. That is, FIGS. 10A and 10B correspond to FIGS. 6A and 6B, respectively.

Figure 11B:
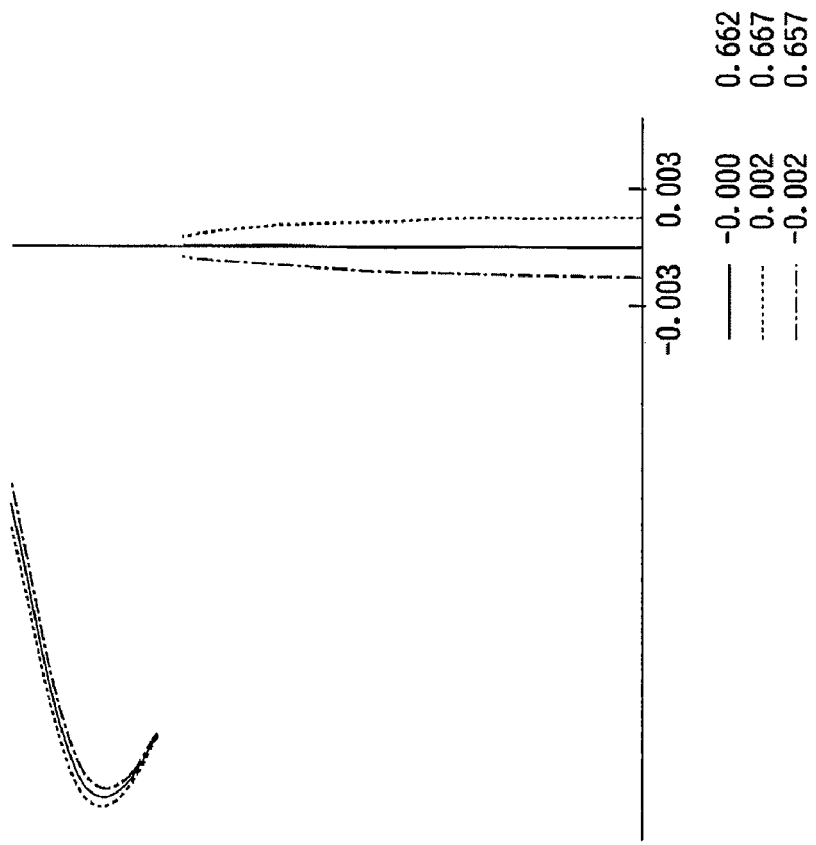
FIGS. 11A and 11B show the spherical aberration of the use diffraction order light when optical discs D1 and D2 are used, respectively, in a fourth example.
Figure 11A:
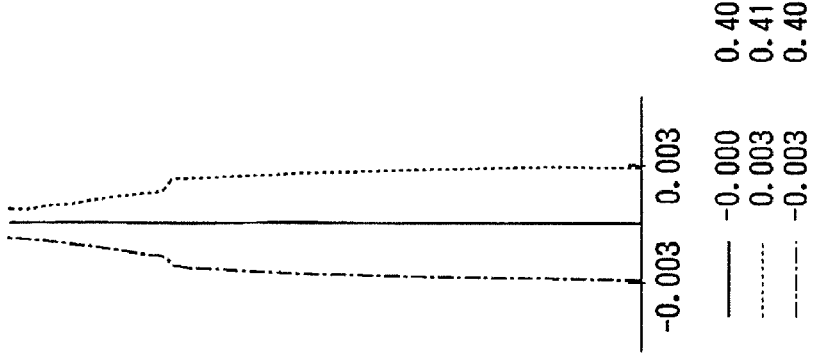

FIGS. 11A and 11B show the spherical aberrations of the use order diffraction light caused in the fourth example when the optical discs D1 and D2 are used, respectively. That is, FIGS. 11A and 11B correspond to FIGS. 5A and 5B, respectively. FIGS. 12A and 12B show the spherical aberrations of the use diffraction order light and the undesired diffraction order light caused in the fourth example when the optical discs D1 and D2 are used, respectively. That is, FIGS. 12A and 12B correspond to FIGS. 6A and 6B, respectively.

Figure 13B:
FIGS. 13A and 13B show the spherical aberration of the use diffraction order light when optical discs D1 and D2 are used, respectively, in a fifth example.
Figure 13A:
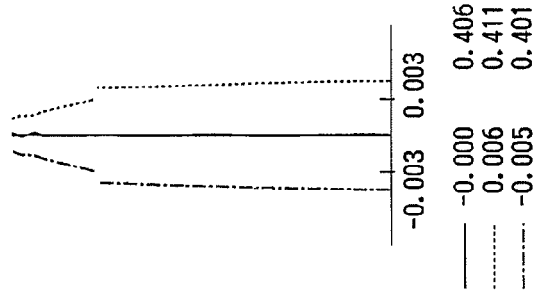

FIGS. 13A and 13B show the spherical aberrations of the use order diffraction light caused in the fifth example when the optical discs D1 and D2 are used, respectively. That is, FIGS. 13A and 13B correspond to FIGS. 5A and 5B, respectively. FIGS. 14A and 14B show the spherical aberrations of the use diffraction order light and the undesired diffraction order light caused in the fifth example when the optical discs D1 and D2 are used, respectively. That is, FIGS. 13A and 13B correspond to FIGS. 6A and 6B, respectively.

FIGS. 15A and 15B show the spherical aberrations of the use order diffraction light caused in the sixth example when the optical discs D1 and D2 are used, respectively. That is, FIGS. 15A and 15B correspond to FIGS. 5A and 5B, respectively. FIGS. 16A and 16B show the spherical aberrations of the use diffraction order light and the undesired diffraction order light caused in the sixth example when the optical discs D1 and D2 are used, respectively. That is, FIGS. 16A and 16B correspond to FIGS. 6A and 6B, respectively.

Figure 18B:
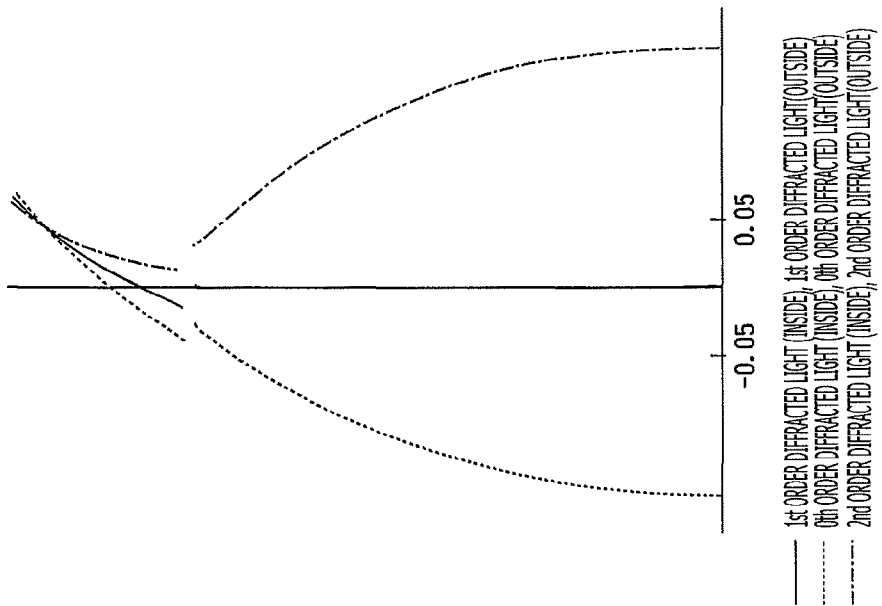
FIGS. 18A and 18B show the spherical aberrations of the use diffraction order light and the undesired diffraction order light when the optical discs D1 and D2 are used, respectively, in the seventh example.
Figure 18A:
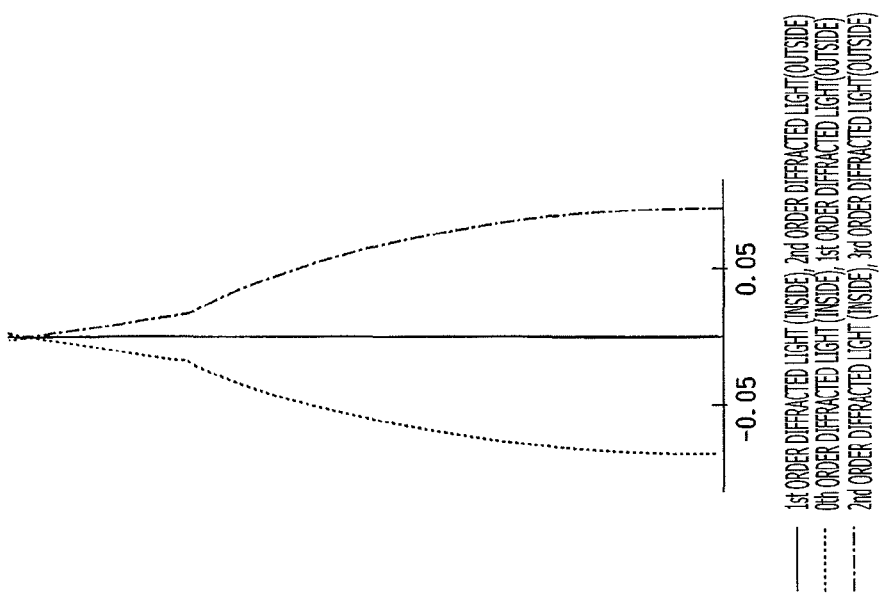

FIGS. 17A and 17B show the spherical aberrations of the use order diffraction light caused in the seventh example when the optical discs D1 and D2 are used, respectively. That is, FIGS. 17A and 17B correspond to FIGS. 5A and 5B, respectively. FIGS. 18A and 18B show the spherical aberrations of the use diffraction order light and the undesired diffraction order light caused in the seventh example when the optical discs D1 and D2 are used, respectively. That is, FIGS. 18A and 18B correspond to FIGS. 6A and 6B, respectively.

Figure 20B:
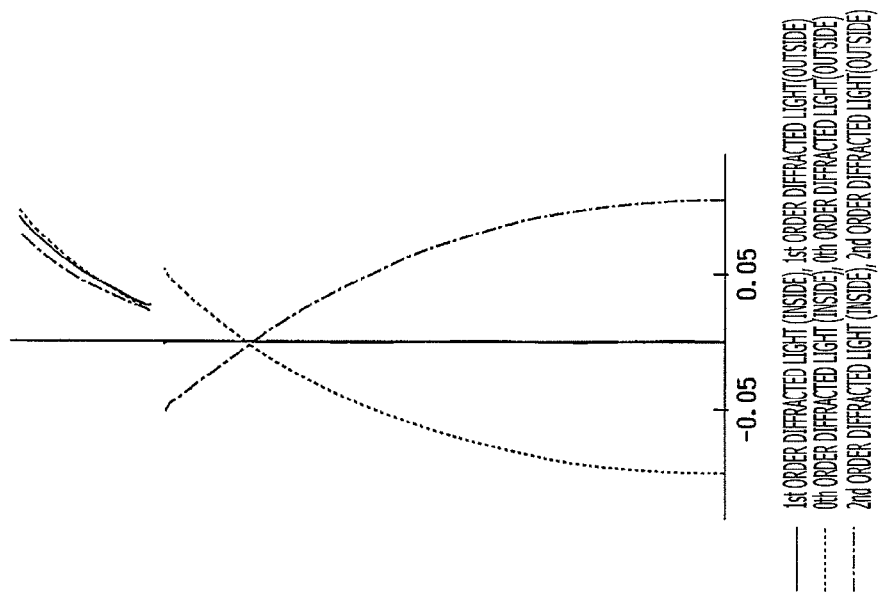
FIGS. 20A and 20B show the spherical aberrations of the use diffraction order light and the undesired diffraction order light when the optical discs D1 and D2 are used, respectively, in the eighth example.
Figure 20A:
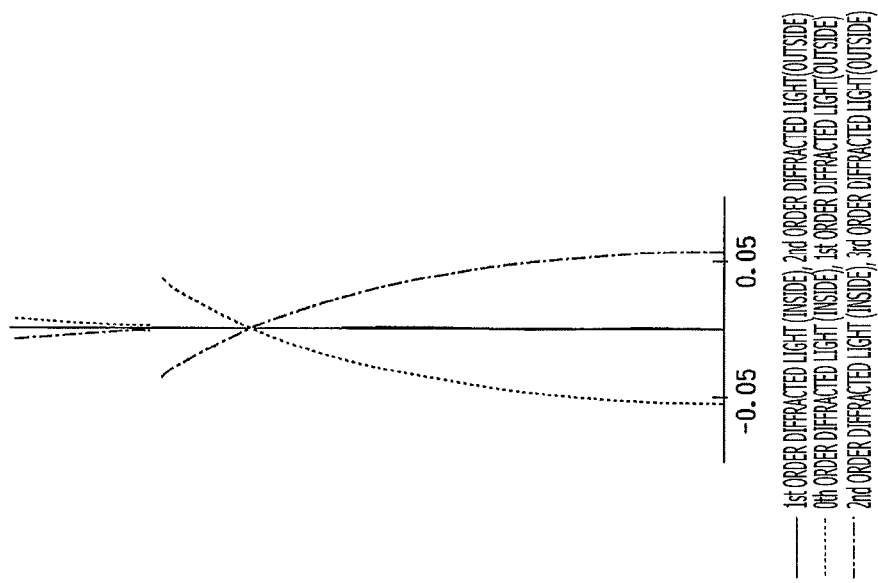

FIGS. 19A and 19B show the spherical aberrations of the use order diffraction light caused in the eighth example when the optical discs D1 and D2 are used, respectively. That is, FIGS. 19A and 19B correspond to FIGS. 5A and 5B, respectively. FIGS. 20A and 20B show the spherical aberrations of the use diffraction order light and the undesired diffraction order light caused in the eighth example when the optical discs D1 and D2 are used, respectively. That is, FIGS. 20A and 20B correspond to FIGS. 6A and 6B, respectively.

Figure 22B:
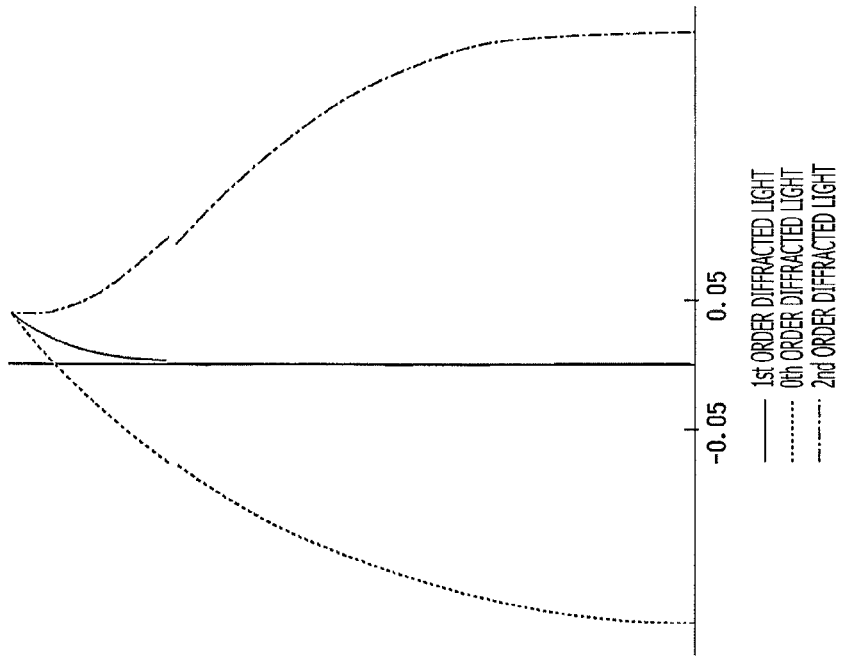
FIGS. 22A and 22B show the spherical aberrations of the use diffraction order light and the undesired diffraction order light when the optical discs D1 and D2 are used, respectively, in the ninth example.
Figure 22A:
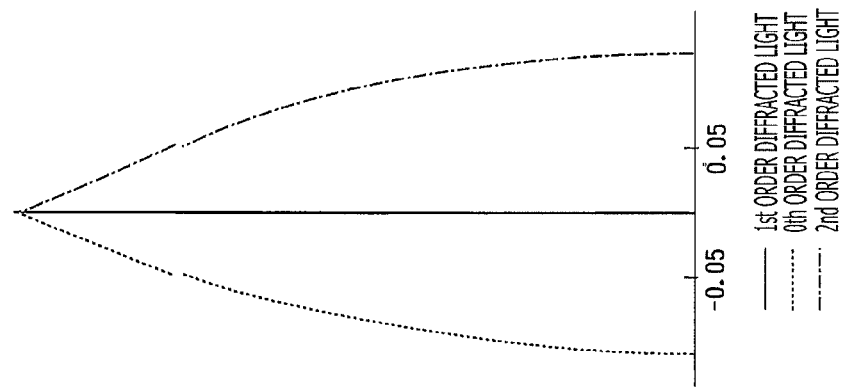

FIGS. 21A and 21B show the spherical aberrations of the use order diffraction light caused in the ninth example when the optical discs D1 and D2 are used, respectively. That is, FIGS. 21A and 21B correspond to FIGS. 5A and 5B, respectively. FIGS. 22A and 22B show the spherical aberrations of the use diffraction order light and the undesired diffraction order light caused in the ninth example when the optical discs D1 and D2 are used, respectively. That is, FIGS. 22A and 22B correspond to FIGS. 6A and 6B, respectively.

Figure 23B:
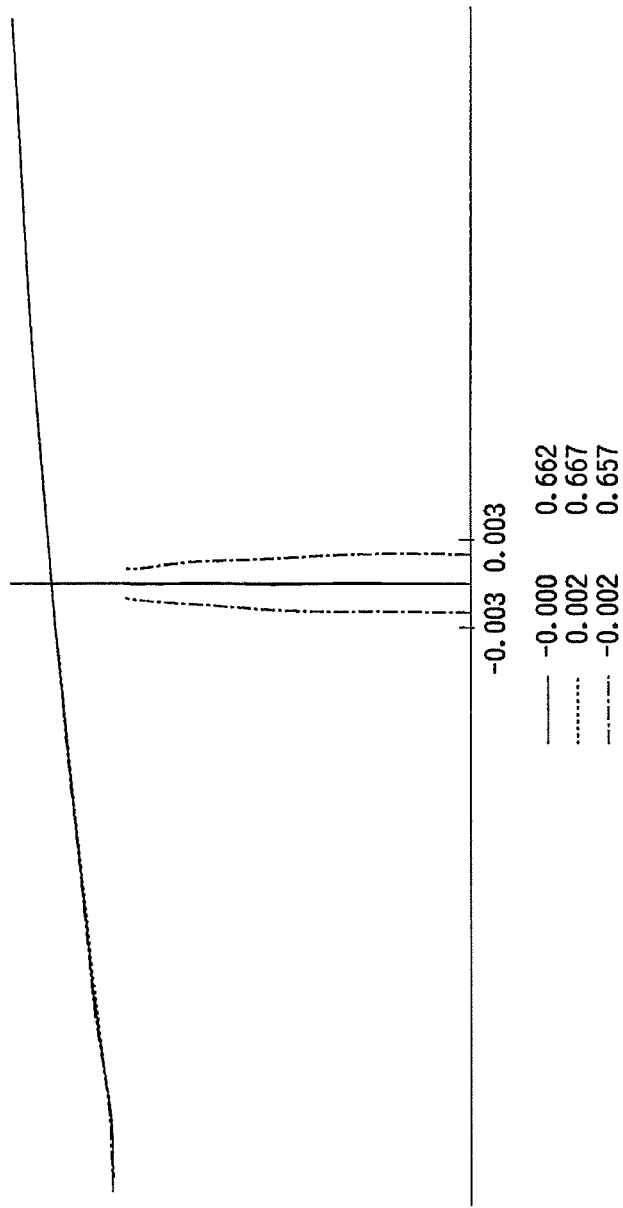
FIGS. 23A and 23B show the spherical aberration of the use diffraction order light when optical discs D1 and D2 are used, respectively, in a tenth example.
Figure 23A:
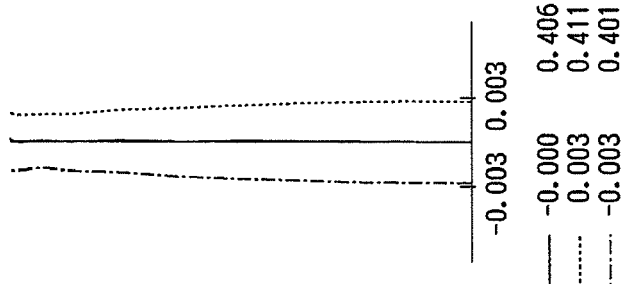
Figure 24B:
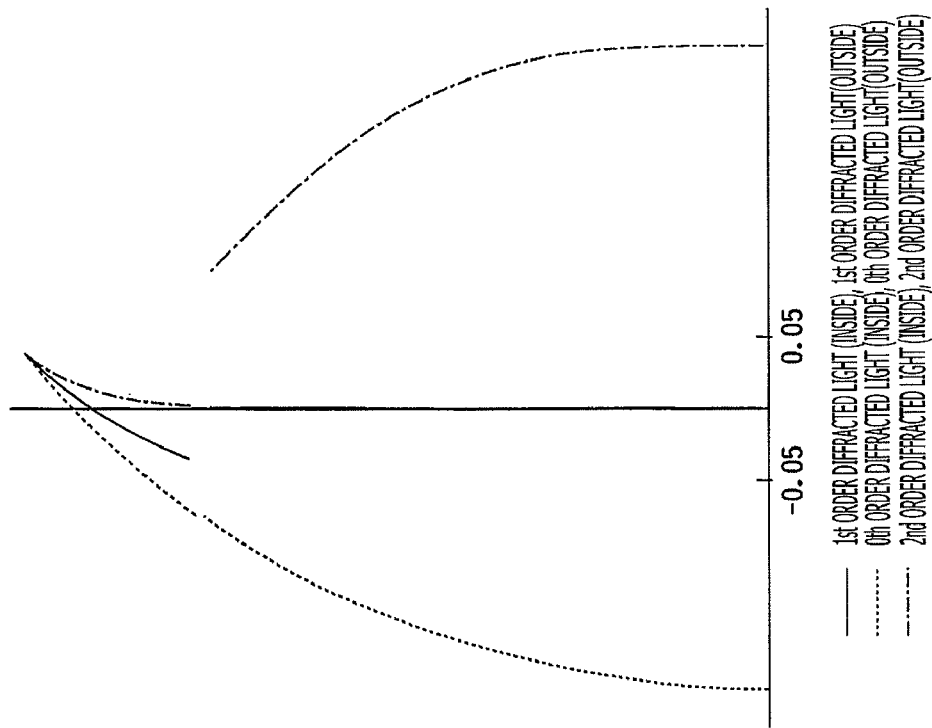
FIGS. 24A and 24B show the spherical aberrations of the use diffraction order light and the undesired diffraction order light when the optical discs D1 and D2 are used, respectively, in the tenth example.
Figure 24A:
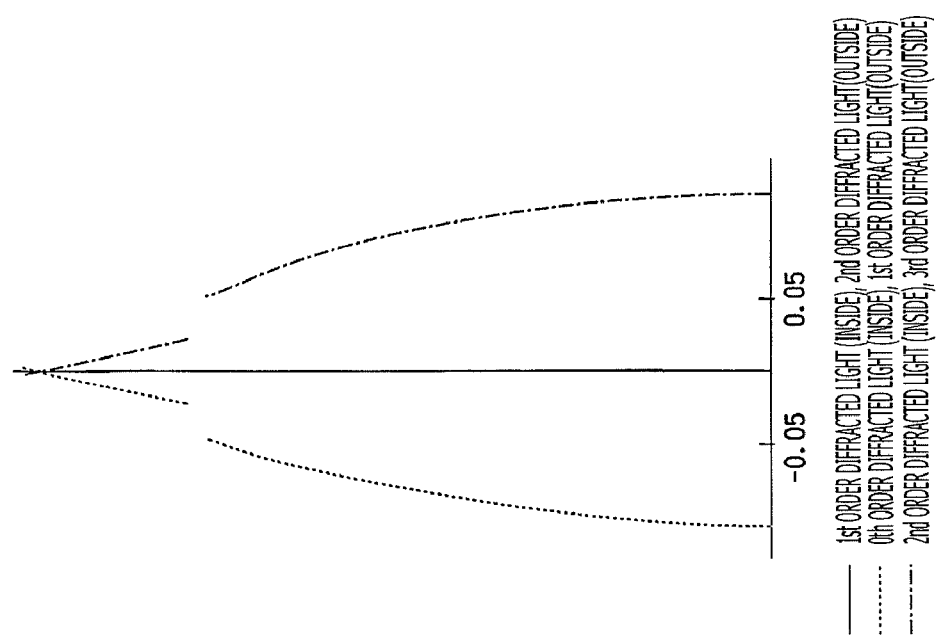

FIGS. 23A and 23B show the spherical aberrations of the use order diffraction light caused in the tenth example when the optical discs D1 and D2 are used, respectively. That is, FIGS. 23A and 23B correspond to FIGS. 5A and 5B, respectively. FIGS. 24A and 24B show the spherical aberrations of the use diffraction order light and the undesired diffraction order light caused in the tenth example when the optical discs D1 and D2 are used, respectively. That is, FIGS. 24A and 24B correspond to FIGS. 6A and 6B, respectively.

Figure 26B:
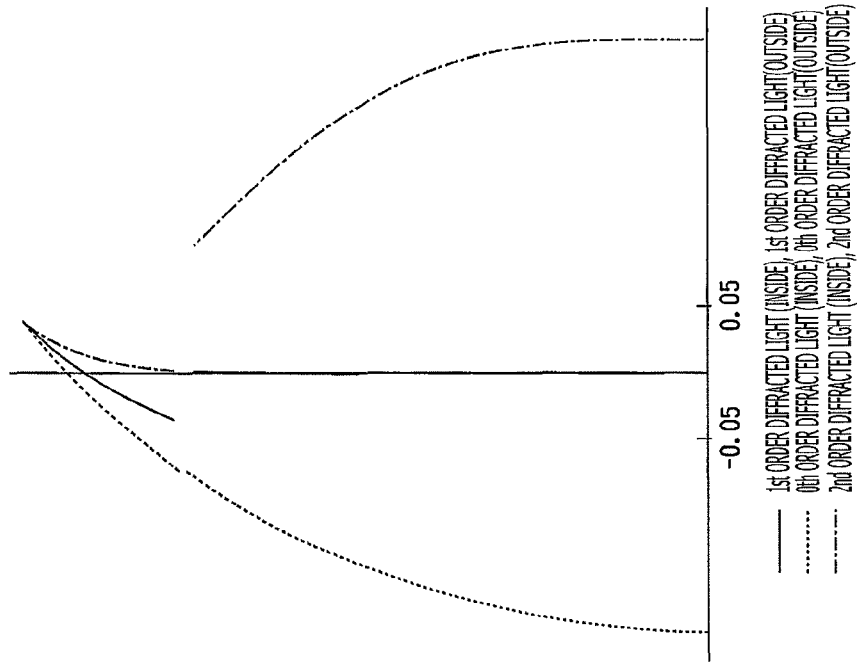
FIGS. 26A and 26B show the spherical aberrations of the use diffraction order light and the undesired diffraction order light when the optical discs D1 and D2 are used, respectively, in the eleventh example.
Figure 26A:
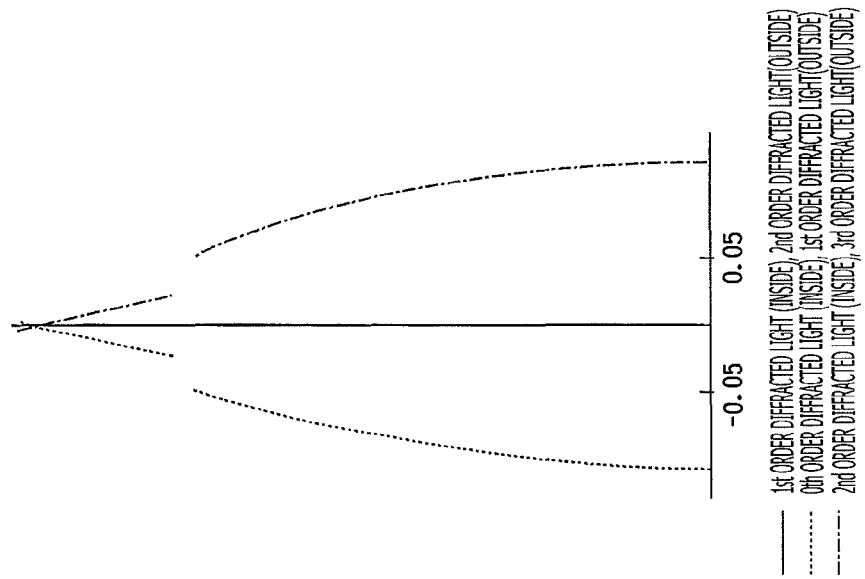

FIGS. 25A and 25B show the spherical aberrations of the use order diffraction light caused in the eleventh example when the optical discs D1 and D2 are used, respectively. That is, FIGS. 25A and 25B correspond to FIGS. 5A and 5B, respectively. FIGS. 26A and 26B show the spherical aberrations of the use diffraction order light and the undesired diffraction order light caused in the eleventh example when the optical discs D1 and D2 are used, respectively. That is, FIGS. 26A and 26B correspond to FIGS. 6A and 6B, respectively.

Figure 28B:
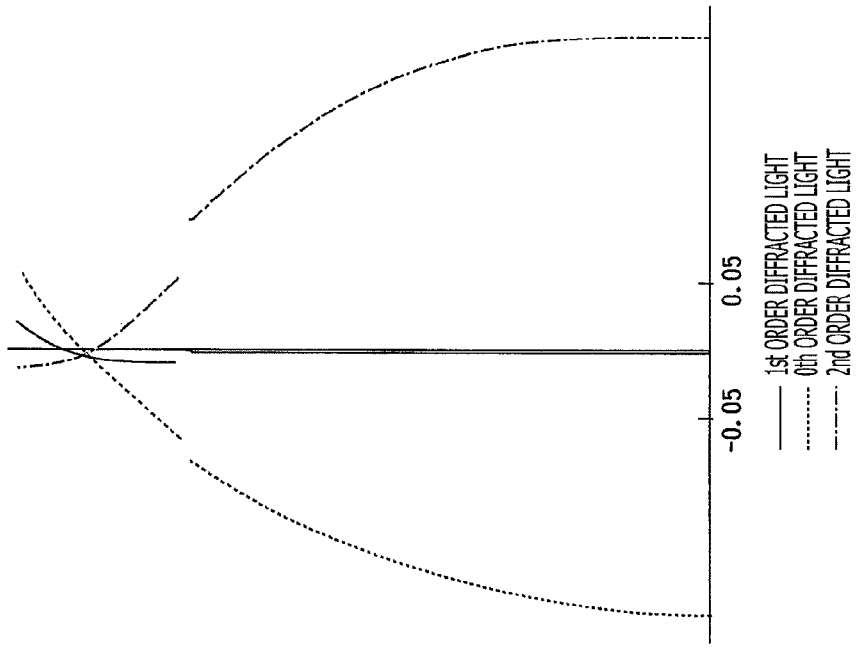
FIGS. 28A and 28B show the spherical aberrations of the use diffraction order light and the undesired diffraction order light when the optical discs D1 and D2 are used, respectively, in the twelfth example.
Figure 28A:
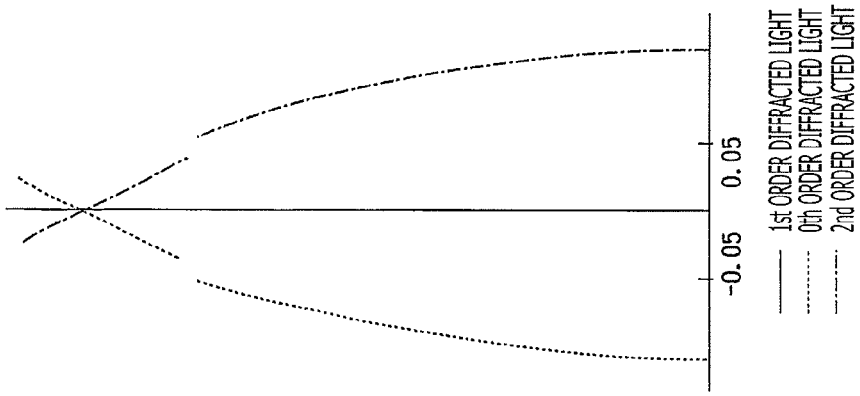

FIGS. 27A and 27B show the spherical aberrations of the use order diffraction light caused in the twelfth example when the optical discs D1 and D2 are used, respectively. That is, FIGS. 27A and 27B correspond to FIGS. 5A and 5B, respectively. FIGS. 28A and 28B show the spherical aberrations of the use diffraction order light and the undesired diffraction order light caused in the twelfth example when the optical discs D1 and D2 are used, respectively. That is, FIGS. 28A and 28B correspond to FIGS. 6A and 6B, respectively. As shown in FIGS. 7A-7B to 28A-28B, in each of the first to twelfth examples, the undesired light or the undesired diffraction order light is intentionally generated. That is, in each of the first to twelfth examples, deterioration of the signals by the undesired light or the undesired diffraction order light is effectively suppressed by moving the paraxial focal point of the undesired light or the undesired diffraction order light away from the recording surface of the optical disc (i.e., the normal focal point).

As described above, the objective lens 10 according each of the first to twelfth examples has the excellent optical property for the information recording or information reproducing for each of the optical discs D1 and D2.

Although the present invention has been described in considerable detail with reference to certain preferred embodiments thereof, other embodiments are possible.

This application claims priority of Japanese Patent Application No. P2010-068688, filed on Mar. 24, 2010. The entire subject matter of the applications is incorporated herein by reference.

What is claimed is:

1. An objective lens for an optical information recording/reproducing apparatus for recording information to and/or reproducing information from two types of optical discs including first and second optical discs differing in recording density by selectively using two types of light beams including first and second light beams respectively having first and second wavelengths, the first light beam being a substantially collimated light beam and the second light beam being one of a substantially collimated beam and a diverging light beam, when $\lambda 1$ (unit: nm) represents the first wavelength and $\lambda 2$ (unit: nm) represents the second wavelength, $\lambda 1$ and $\lambda 2$ satisfying conditions:

$$390<\lambda 1<420; \text{ and}$$

$$640<\lambda 2<700$$

when t1 (unit: mm) represents a protective layer thickness of the first optical disc for which information recording or information reproducing is performed by using the first light beam, and t2 (unit: mm) represents a protective layer thickness of the second optical disc for which information recording or information reproducing is performed by using the second light beam, t1 and t2 satisfying conditions:

$$0.05<t1<0.15; \text{ and}$$

$$0.50<t2<0.70,$$

when NA1 represents a numerical aperture required for the information recording or information reproducing for the first optical disc, and NA2 represents a numerical aperture required for the information recording or information reproducing for the second optical disc, NA1 and NA2 satisfying a condition:

$$NA1>NA2,$$

wherein:

at least one of optical surfaces of the objective lens comprises a diffraction surface having a diffraction structure defined by an optical path difference function:

$$\phi(h)=(P_2 \times h^2 + P_4 \times h^4 + P_6 \times h^6 + P_8 \times h^8 + P_{10} \times h^{10} + P_{12} \times h^{12})m\lambda$$

where $P_2$, $P_4$, $P_6$ ... represent coefficients of the $2^{nd}$ order, $4^{th}$ order, $6^{th}$ order, h represents a height from an optical axis, m represents a diffraction order at which a diffraction efficiency of an incident light beam is maximized, and $\lambda$ represents a design wavelength of the incident light beam;

the diffraction surface has a first region contributing to converging the first light beam onto a recording surface of the first optical disc and converging the second light beam onto a recording surface of the second optical disc;

the first region has a diffraction structure configured such that each of a diffraction order at which a diffraction efficiency is maximized for the first light beam and a diffraction order at which a diffraction efficiency is maximized for the second light beam is $1^{st}$ order;

the diffraction surface has a second region located outside the first region;

the second region is configured to contribute to converging the first light beam onto the recording surface of the first optical disc and not to contribute to convergence of the second light beam;

when P2 represents a $2^{nd}$ order coefficient of the optical path difference function defining the diffraction structure in the first region, and f2 (unit: mm) represents a focal length of the objective lens with respect to a diffracted light beam of the second light beam having a diffraction order at which the diffraction efficiency is maximized for the second light beam passing through the first region, the objective lens satisfies a condition:

$$35<P2 \times f2<200 \tag{1}.$$

2. The objective lens according to claim 1, wherein, when $\lambda B1$ (unit: nm) represents a blazed wavelength in the first region, the objective lens satisfies a condition:

$$450<\lambda B1<550 \tag{2}.$$

3. The objective lens according to claim 1, wherein the second region has a diffraction structure configured to give a spherical aberration to the second light beam passing through the second region so that the second light beam passing through the second region is made into flare light.

4. The objective lens according to claim 1, wherein, when n2 represents a refractive index of the objective lens with respect to the wavelength $\lambda 2$, R1 represents a curvature radius of a light source side surface of the objective lens, and D represents a lens thickness of the objective lens on the optical axis, the objective lens satisfies a condition:

$$f2 \times (1+2 \times P2 \times \lambda 2 - D \times (n2-1)/(n2 \times R1))>0.57 \tag{5}.$$

5. The objective lens according to claim 1, wherein the objective lens satisfies a condition:

$$70<P2 \times f2<200 \tag{6}.$$

6. The objective lens according to claim 1,
wherein, when f1 represents a focal length (unit: mm) of the objective lens with respect to diffracted light having a diffraction order at which the diffraction efficiency is maximized for the first light beam, the objective lens satisfies a condition:

$$1.0 < f1 < 1.6 \tag{7}$$

7. The objective lens according to claim 1, wherein a diffraction order at which the diffraction efficiency is maximized for the first light beam in the second region is a $1^{st}$ order.

8. The objective lens according to claim 1, wherein, when MM2 represents a magnification of the objective lens with respect to the second light beam, the objective lens satisfies a condition:

$$-0.020 < MM2 \leq 0.000 \tag{8}$$

9. An optical information recording/reproducing apparatus for recording information to and/or reproducing information from two types of optical discs including first and second optical discs differing in recording density by selectively using two types of light beams including first and second light beams respectively having first and second wavelengths, the first light beam being a substantially collimated light beam and the second light beam being one of a substantially collimated beam and a diverging light beam,
when $\lambda 1$ (unit: nm) represents the first wavelength and $\lambda 2$ (unit: nm) represents the second wavelength, $\lambda 1$ and $\lambda 2$ satisfying conditions:

$$390 < \lambda 1 < 420;\ \text{and}$$

$$640 < \lambda 2 < 700$$

when t1 (unit: mm) represents a protective layer thickness of the first optical disc for which information recording or information reproducing is performed by using the first light beam, and t2 (unit: mm) represents a protective layer thickness of the second optical disc for which information recording or information reproducing is performed by using the second light beam, t1 and t2 satisfying conditions:

$$0.05 < t1 < 0.15;\ \text{and}$$

$$0.50 < t2 < 0.70,$$

when NA1 represents a numerical aperture required for the information recording or information reproducing for the first optical disc, and NA2 represents a numerical aperture required for the information recording or information reproducing for the second optical disc, NA1 and NA2 satisfying a condition:

$$NA1 > NA2,$$

the optical information recording/reproducing apparatus comprising an objective lens,
wherein:
at least one of optical surfaces of the objective lens comprises a diffraction surface having a diffraction structure defined by an optical path difference function:

$$\phi(h) = (P_2 \times h^2 + P_4 \times h^4 + P_6 \times h^6 + P_8 \times h^8 + P_{10} \times h^{10} + P_{12} \times h^{12}) m \lambda$$

where $P_2$, $P_4$, $P_6$ ... represent coefficients of the $2^{nd}$ order, $4^{th}$ order, $6^{th}$ order, h represents a height from an optical axis, m represents a diffraction order at which a diffraction efficiency of an incident light beam is maximized, and $\lambda$ represents a design wavelength of the incident light beam;
the diffraction surface has a first region contributing to converging the first light beam onto a recording surface of the first optical disc and converging the second light beam onto a recording surface of the second optical disc;
the first region has a diffraction structure configured such that each of a diffraction order at which a diffraction efficiency is maximized for the first light beam and a diffraction order at which a diffraction efficiency is maximized for the second light beam is $1^{st}$ order;
the diffraction surface has a second region located outside the first region;
the second region is configured to contribute to converging the first light beam onto the recording surface of the first optical disc and not to contribute to convergence of the second light beam;
when P2 represents a $2^{nd}$ order coefficient of the optical path difference function defining the diffraction structure in the first region, and f2 (unit: mm) represents a focal length of the objective lens with respect to a diffracted light beam of the second light beam having a diffraction order at which the diffraction efficiency is maximized for the second light beam passing through the first region, the objective lens satisfies a condition:

$$35 < P2 \times f2 < 200 \tag{1}$$

10. An objective lens for an optical information recording/reproducing apparatus for recording information to and/or reproducing information from two types of optical discs including first and second optical discs differing in recording density by selectively using two types of light beams including first and second light beams respectively having first and second wavelengths, the first light beam being a substantially collimated light beam and the second light beam being one of a substantially collimated beam and a diverging light beam,
when $\lambda 1$ (unit: nm) represents the first wavelength and $\lambda 2$ (unit: nm) represents the second wavelength, $\lambda 1$ and $\lambda 2$ satisfying conditions:

$$390 < \lambda 1 < 420;\ \text{and}$$

$$640 < \lambda 2 < 700$$

when t1 (unit: mm) represents a protective layer thickness of the first optical disc for which information recording or information reproducing is performed by using the first light beam, and t2 (unit: mm) represents a protective layer thickness of the second optical disc for which information recording or information reproducing is performed by using the second light beam, t1 and t2 satisfying conditions:

$$0.05 < t1 < 0.15;\ \text{and}$$

$$0.50 < t2 < 0.70,$$

when NA1 represents a numerical aperture required for the information recording or information reproducing for the first optical disc, and NA2 represents a numerical aperture required for the information recording or information reproducing for the second optical disc, NA1 and NA2 satisfying a condition:

$$NA1 > NA2,$$

wherein:
at least one of optical surfaces of the objective lens comprises a diffraction surface having a diffraction structure defined by an optical path difference function:

$$\phi(h) = (P_2 \times h^2 + P_4 \times h^4 + P_6 \times h^6 + P_8 \times h^8 + P_{10} \times h^{10} + P_{12} \times h^{12}) m \lambda$$

where $P_2$, $P_4$, $P_6$ ... represent coefficients of the $2^{nd}$ order, $4^{th}$ order, $6^{th}$ order, h represents a height from an optical axis, m represents a diffraction order at which a diffraction efficiency of an incident light beam, and λ represents a design wavelength of the incident light beam;

the diffraction surface has a first region contributing to converging the first light beam onto a recording surface of the first optical disc and converging the second light beam onto a recording surface of the second optical disc;

the first region has a diffraction structure configured such that each of a diffraction order which a diffraction efficiency is maximized for the first light beam and a diffraction order at which a diffraction efficiency is maximized for the second light beam is $1^{st}$ order;

the diffraction surface has a second region located outside the first region;

the second region is configured to contribute to converging the first light beam onto the recording surface of the first optical disc and not to contribute to convergence of the second light beam;

when P2 represents a $2^{nd}$ order coefficient of the optical path difference function defining the diffraction structure in the first region, and f2 (unit: mm) represents a focal length of the objective lens with respect to a diffracted light beam of the second light beam having a diffraction order at which the diffraction efficiency is maximized for the second light beam passing through the first region, and λB1 (unit: nm) represents a blazed wavelength in the first region, the objective lens satisfies a condition:

$$-0.010 < (\lambda B1 - \lambda 2)/(P2 \times f2 \times \lambda 2) < -0.001 \qquad (3).$$

11. The objective lens according to claim 10, wherein the second region has a diffraction structure configured to give a spherical aberration to the second light beam passing through the second region so that the second light beam passing through the second region is made into flare light.

12. The objective lens according to claim 10, wherein, when λB2 (unit: nm) represents a blazed wavelength of the diffraction structure in the second region, the objective lens satisfies a condition:

$$390 < \lambda B2 < 420 \qquad (4).$$

13. The objective lens according to claim 10, wherein, when n2 represents a refractive index of the objective lens with respect to the wavelength λ2, R1 represents a curvature radius of a light source side surface of the objective lens, and D represents a lens thickness of the objective lens on the optical axis, the objective lens satisfies a condition:

$$f2 \times (1 + 2 \times P2 \times \lambda 2 - D \times (n2-1)/(n2 \times R1)) > 0.57 \qquad (5).$$

14. The objective lens according to claim 10, wherein the objective lens satisfies a condition:

$$70 < P2 \times f2 < 200 \qquad (6).$$

15. The objective lens according to claim 10, wherein, when f1 represents a focal length (unit: mm) of the objective lens with respect to diffracted light having a diffraction order at which the diffraction efficiency is maximized for the first light beam, the objective lens satisfies a condition:

$$1.0 < f1 < 1.6 \qquad (7).$$

16. The objective lens according to claim 10, wherein a diffraction order at which the diffraction efficiency is maximized for the first light beam in the second region is a $1^{st}$ order.

17. The objective lens according to claim 10, wherein, when MM2 represents a magnification of the objective lens with respect to the second light beam, the objective lens satisfies a condition:

$$-0.020 < MM2 \leq 0.000 \qquad (8).$$

18. An optical information recording/reproducing apparatus for recording information to and/or reproducing information from two types of optical discs including first and second optical discs differing in recording density by selectively using two types of light beams including first and second light beams respectively having first and second wavelengths, the first light beam being a substantially collimated light beam and the second light beam being one of a substantially collimated beam and a diverging light beam, when λ1 (unit: nm) represents the first wavelength and λ2 (unit: nm) represents the second wavelength, λ1 and λ2 satisfying conditions:

$$390 < \lambda 1 < 420; \text{ and}$$

$$640 < \lambda 2 < 700$$

when t1 (unit: mm) represents a protective layer thickness of the first optical disc for which information recording or information reproducing is performed by using the first light beam, and t2 (unit: mm) represents a protective layer thickness of the second optical disc for which information recording or information reproducing is performed by using the second light beam, t1 and t2 satisfying conditions:

$$0.05 < t1 < 0.15; \text{ and}$$

$$0.50 < t2 < 0.70,$$

when NA1 represents a numerical aperture required for the information recording or information reproducing for the first optical disc, and NA2 represents a numerical aperture required for the information recording or information reproducing for the second optical disc, NA1 and NA2 satisfying a condition:

$$NA1 > NA2,$$

the optical information recording/reproducing apparatus comprising an objective lens, wherein:

at least one of optical surfaces of the objective lens comprises a diffraction surface having a diffraction structure defined by an optical path difference function:

$$\phi(h) = (P_2 \times h^2 + P_4 \times h^4 + P_6 \times h^6 + P_8 \times h^8 + P_{10} \times h^{10} + P_{12} \times h^{12}) m\lambda$$

where $P_2$, $P_4$, $P_6$ ... represent coefficients of the $2^{nd}$ order, $4^{th}$ order, $6^{th}$ order, h represents a height from an optical axis, m represents a diffraction order at which a diffraction efficiency of an incident light beam is maximized, and λ represents a design wavelength of the incident light beam;

the diffraction surface has a first region contributing to converging the first light beam onto a recording surface of the first optical disc and converging the second light beam onto a recording surface of the second optical disc;

the first surface has a diffraction structure configured such that each of a diffraction order which the diffraction efficiency is maximized for the first light beam and a diffraction order at which the diffraction efficiency is maximized for the second light beam is $1^{st}$ order;

the diffraction surface has a second region located outside the first region;

the second region is configured to contribute to converging the first light beam onto the recording surface of the first optical disc and not to contribute to convergence of the second light beam;

when P2 represents a $2^{nd}$ order coefficient of the optical path difference function defining the diffraction structure in the first region, and f2 (unit: mm) represents a focal length of the objective lens with respect to a diffracted light beam of the second light beam having a diffraction order at which the diffraction efficiency is maximized for the second light beam passing through the first region, and $\lambda B1$ (unit: nm) represents a blazed wavelength in the first region, the objective lens satisfies a condition:

$$-0.010 < (\lambda B1 - \lambda 2)/(P2 \times f2 \times \lambda 2) < -0.001 \tag{3}$$

* * * * *